US008548269B2

(12) United States Patent
Zargarpour et al.

(10) Patent No.: US 8,548,269 B2
(45) Date of Patent: Oct. 1, 2013

(54) SEAMLESS LEFT/RIGHT VIEWS FOR 360-DEGREE STEREOSCOPIC VIDEO

(75) Inventors: Habib Zargarpour, Bellingham, WA (US); Ben Vaught, Seattle, WA (US); Sing Bing Kang, Redmond, WA (US); Michael Rondinelli, Canonsburg, PA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 12/971,840

(22) Filed: Dec. 17, 2010

(65) Prior Publication Data

US 2012/0155786 A1 Jun. 21, 2012

(51) Int. Cl.
*G06K 9/36* (2006.01)
*G06K 9/32* (2006.01)

(52) U.S. Cl.
USPC .......................................... 382/284; 382/294

(58) Field of Classification Search
None
See application file for complete search history.

(56) References Cited

U.S. PATENT DOCUMENTS

| | | | |
|---|---|---|---|
| 5,657,073 A | 8/1997 | Henley | |
| 6,157,747 A * | 12/2000 | Szeliski et al. | 382/284 |
| 6,356,297 B1 | 3/2002 | Cheng et al. | |
| 6,359,617 B1 * | 3/2002 | Xiong | 715/848 |
| 6,459,451 B2 | 10/2002 | Driscoll, Jr. et al. | |
| 6,639,596 B1 | 10/2003 | Shum et al. | |
| 7,184,609 B2 | 2/2007 | Liu et al. | |
| 7,224,382 B2 | 5/2007 | Baker | |
| 7,382,927 B2 | 6/2008 | Sezan et al. | |
| 7,399,095 B2 | 7/2008 | Rondinelli | |
| 7,460,730 B2 | 12/2008 | Pal et al. | |
| 7,463,280 B2 | 12/2008 | Steuart, III | |
| 7,583,288 B2 | 9/2009 | Uyttendaele et al. | |
| 7,701,577 B2 | 4/2010 | Straaijer et al. | |
| 7,710,451 B2 | 5/2010 | Gluckman et al. | |
| 7,837,330 B2 | 11/2010 | Montgomery et al. | |
| 7,859,572 B2 | 12/2010 | Leberl et al. | |
| 7,877,007 B2 | 1/2011 | Yoon et al. | |
| 7,952,606 B2 | 5/2011 | Kweon et al. | |
| 2002/0126890 A1 * | 9/2002 | Katayama et al. | 382/154 |
| 2002/0154812 A1 | 10/2002 | Chen et al. | |
| 2003/0052890 A1 * | 3/2003 | Raskar et al. | 345/581 |
| 2003/0053080 A1 | 3/2003 | Gianchandani et al. | |
| 2003/0095338 A1 | 5/2003 | Singh et al. | |

(Continued)

FOREIGN PATENT DOCUMENTS

WO WO 03/054625 * 7/2003

OTHER PUBLICATIONS

Chiba et al, Feature-Based Image Mosaicing, 2000, Systems and Computers in Japan, vol. 31, No. 7, pp. 1-9.*

(Continued)

*Primary Examiner* — Bhavesh Mehta
*Assistant Examiner* — David F Dunphy
(74) *Attorney, Agent, or Firm* — Vierra Magen Marcus LLP

(57) ABSTRACT

A method is disclosed for stitching together first and second sets of images from three or more image sensors. The first set of images are combined into a composite left view of the panorama, and the second set of images are combined into a composite right view of the panorama. When properly stitched together, the left and right views may be presented as a stereoscopic view of the panorama. A stitching algorithm is applied which removes any disparity due to the parallax in the combined left images and in the combined right images.

17 Claims, 22 Drawing Sheets

(56) References Cited

U.S. PATENT DOCUMENTS

| | | | |
|---|---|---|---|
| 2003/0220971 | A1 | 11/2003 | Kressin |
| 2004/0021766 | A1 | 2/2004 | Daniilidis et al. |
| 2006/0115181 | A1 | 6/2006 | Deng et al. |
| 2007/0025723 | A1 | 2/2007 | Baudisch et al. |
| 2007/0299912 | A1 | 12/2007 | Sharma et al. |
| 2008/0158341 | A1* | 7/2008 | Gelsomini et al. ............... 348/36 |
| 2008/0192110 | A1 | 8/2008 | Grover |
| 2008/0298674 | A1 | 12/2008 | Baker et al. |
| 2009/0073256 | A1 | 3/2009 | Steuart, III |
| 2010/0054628 | A1 | 3/2010 | Levy et al. |
| 2010/0141766 | A1 | 6/2010 | Milinusic et al. |
| 2010/0157018 | A1 | 6/2010 | Lampotang et al. |
| 2010/0201781 | A1 | 8/2010 | Trubko et al. |
| 2012/0086863 | A1* | 4/2012 | Williams et al. ............... 348/699 |

OTHER PUBLICATIONS

"The 0-360 Panoramic Optic." 0-360.com [online]. Retrieved from the Internet on Jul. 2, 2010: URL: <http://www.0-360.com/index.asp?ID=google&gclid=CKj-hK_5y6ICFUQB4wodzFFizA>, pp. 1-3.

Good, Robin. "360 Panoramic Video Capture and Recording: immersive, Fully Navigable Video Is Here." Robin Good's MasterNewMedia [online], Apr. 22, 2008, retrieved from the Internet on Jul. 1, 2010: URL: <http://www.masternewmedia.org/news/2008/04/22/360_panoramic_video_capture_and.htm>, pp. 1-10.

"Kaidan is no longer selling products—Stay tuned for additional information." Kaidan Incorporated [online]. Retrieved from the Internet on Jul. 2, 2010: URL: <http://www.kaidan.com/>, pp. 1-5.

Mannar, Harijumar. "Watch amazing 360 degree 3D panoramic images." Webmalayalee [online]. Apr. 17, 2010, retrieved from the Internet on Jul. 2, 2010: URL: <http://webmalayalee.com/portal/2010/04/17/watch-amazing-360-degree-3d-panoramic-images/>, pp. 1-5.

Quick, Darren. "Video surveillance in 360-degree 3D." gizmag [online]. Mar. 25, 2010, retrieved from the Internet on Jul. 2, 2010: URL: <http://www.gizmag.com/video-surveillance-in-360-degree-3d/14619/>, pp. 1-3.

"Recreating Epic Roman Battles." Point Grey Case Study [online]. Retrieved from the Internet on Jul. 1, 2010: URL: <http://www.ptgrey.com/news/casestudies/pdf/RomanBattles.pdf>, pp. 1-4.

Schonfeld, Erick. "If You Could See Google Street View in Video, It Would Look Like YellowBird." TechCrunch [online], Aug. 3, 2009, retrieved from the Internet on Jul. 1, 2010: URL: <http://techcrunch.com/2009/08/03/if-you-could-see-google-street-view-in-video-it-would-look-like-yellowbird/>, 1 page.

Bourke, Paul. "Stereoscopic 3D Panoramic Images." Paul Bourke [online], May 2002, pp. 1-27. Retrieved from the Internet on Aug. 23, 2010: URL: <http://local.wasp.uwa.edu.au/~pbourke/miscellaneous/stereographics/stereopanoramic/>.

Doi, Munehiro and Tsuyoshi Yamamoto. "PanoVi: A Multi-Camera Panoramic Movie System by Using Client-Side Image Mosaicking." Proceedings of the 2003 Conference on Modelling and Simulation (MS 2003), Feb. 24-26, 2003, pp. 1-5. Palm Springs, CA, USA.

Peleg, Shmuel and Moshe Ben-Ezra. "Stereo Panorama with a Single Camera." Proceedings of the 1999 Conference on Computer Vision and Pattern Recognition (CVPR '99), Jun. 23-25, 1999, pp. 1395-1401, Ft. Collins, CO, USA.

Peleg, Shmuel, Moshe Ben-Ezra and Yael Pritch. "Omnistereo: Panoramic Stereo Imaging." IEEE Transactions on Pattern Analysis and Machine Intelligence, Mar. 2001, pp. 279-290 vol. 23. IEEE Computer Society: Los Alamitos, CA, USA.

Wang, Shengzheng, Chaojian Shi and Baojia Xiao. "3D panoramic stereo imaging system for maritime search and rescue (SAR) simulator." Retrieved from the Internet on Aug. 20, 2010: URL: <http://nornav.custompublish.com/getfile.php/1067007.753.psepqcxbyd/Or%2014.pdf>.

Shum, Heung-Yeung, and Richard Szeliski. "Panoramic Image Mosiacs." Technical Report MSR-TR-97-23, Microsoft Research, Sep. 1997, pp. 1-53.

Szeliski, Richard, and Heung-Yeung Shum. "Creating Full View Panoramic Image Mosaics and Environment Maps." In Proceedings of the 24th Annual International Conference on Computer Graphics and Interactive Techniques, Aug. 3-8, 1997, pp. 251-258, Los Angeles, CA, USA.

"360 Spherical Panorama Video Viewer." Product listing and review [online]. Softsea.com. Retrieved from the Internet on Jul. 6, 2010: URL: <http://www.softsea.com/review/360-Spherical-Panorama-Video-Viewer.html>.

Agarwala, et al. "Panoramic Video Textures." Proceedings of the 32nd International Conference on Computer Graphics and Interactive Techniques. Jul. 31-Aug. 4, 2005, pp. 1-7, Los Angeles, CA, USA.

Sun, et al. "Recording the Region of Interest from Flycam Panoramic Video." Proceedings of the 2001 International Conference on Image Processing, Oct. 7-10, 2001, pp. 409-412, vol. 1, Thessaloniki, Greece.

Office Action dated Feb. 25, 2013 in U.S. Appl. No. 12/971,580.

\* cited by examiner (Step 208)

(Step 212)

*(Step 218)*

*(Step 274)*

Fig. 29
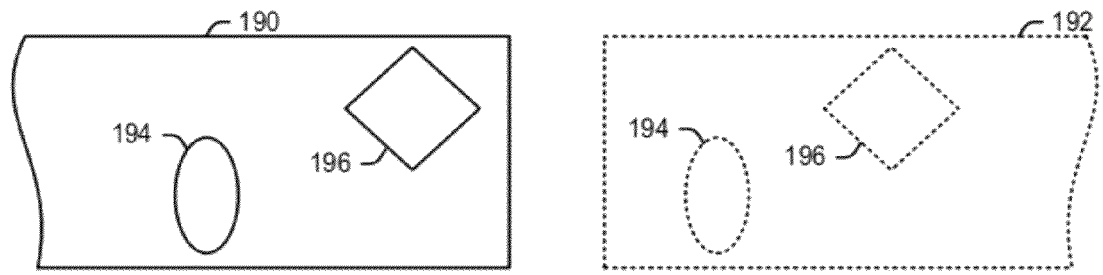
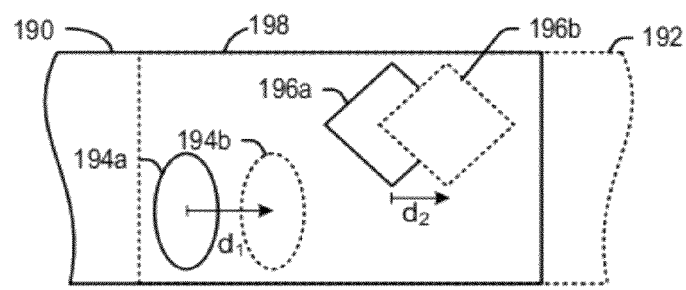
Fig. 30
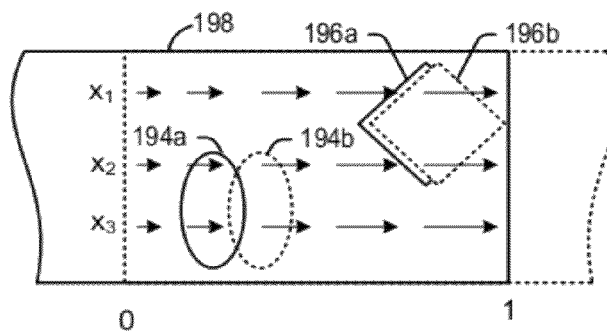
Fig. 31
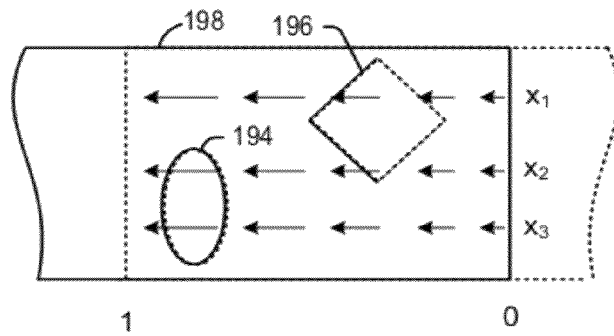
Fig. 32

SEAMLESS LEFT/RIGHT VIEWS FOR 360-DEGREE STEREOSCOPIC VIDEO

BACKGROUND

Human vision uses a variety of cues to perceive three-dimensional (3D) depth in the real world. One of these cues is retinal disparity, where the interocular distance results in the left and right eyes receiving slightly different projections of the world. Stereoscopic imagery attempts to create artificial 3D depth perception by presenting slightly different images to each eye. The two images are captured from different vantage points, set apart from each other a distance approximating the interocular distance of the human eyes. Assuming the images are properly synchronized and the vantage points approximate the interocular distance, the brain processes these images in a way that creates the illusion of depth in the image.

Conventional 3D cameras include a pair of spaced apart image sensors for generating the two views of a scene. While suitable for a front view of the scene, or some other portion of a scene, conventional 3D cameras are not able to obtain a panoramic 360° view of a scene. This is so at least because at some viewing angle around the 360° panorama, the first image sensor will capture a view of the second image sensor, and vice-versa, resulting in occlusions in the 360° view. Another option is to rotate the pair of image sensors to capture full 360° view without any camera occlusion, but this technique would not be able to properly capture dynamic scenes.

SUMMARY

Disclosed herein is a method for stitching together first and second sets of images from three or more image sensors. The first set of images are combined into a composite left view of the panorama, and the second set of images are combined into a composite right view of the panorama. When properly stitched together, the left and right views may be presented as a stereoscopic view of the panorama. A stitching algorithm is applied which removes any disparity due to the parallax in the combined left images and in the combined right images.

The stitching algorithm first computes an optical flow based on the detected disparity of objects in the overlap area due to parallax. The algorithm then cross fades in two passes, from left to right and right to left, to align the objects from the two views in the overlap area. In order to prevent gaps in the stretched images, a weighted factor is applied when stretching the image. Thus, when stretching from left to right, the cross fading is performed with a weighted factor of 0 at the left edge and 1 at the right edge of the overlap. When stretching from right to left, the cross fading is performed with the same weighted factor of 0 at the right edge and 1 at the left edge of the overlap. The image is then warped using the weighted cross fading in both directions. A Laplacian blend may then be applied to the left and right halves of the warped image to smooth out any remaining discrepancies.

In one example, the present technology relates to a method of forming a stereoscopic image from multiple image sensors, comprising the steps of: (a) combining together a first set of images from different image sensors, the first set of images to be used as a left side perspective in the stereoscopic image and the first set of images being combined with an overlap of the first set of images; (b) combining together a second set of images from the different image sensors, the second set of images to be used as a right side perspective in the stereoscopic image and the second set of images being combined with an overlap of the second set of images; (c) removing an appearance of a seam between a pair of images in an overlap area of the first and second set of images, said step (c) including the steps of: i) aligning objects from the two different images in the overlap area by stretching the first image in a first direction by a factor of zero at a first boundary of the overlap and by a factor of one at the opposite boundary, and ii) aligning objects from the two different images in the overlap area by stretching the second image in a second direction, opposite the first direction, by a factor of zero at the second boundary of the overlap and by a factor of one at the opposite boundary.

In a further example, the present technology relates to a method of forming a stereoscopic image from multiple image sensors, comprising the steps of: (a) combining together a first set of images with parallax, the first set of images to be used as a left side perspective in the stereoscopic image and the first set of images being combined with an overlap of the first set of images; (b) combining together a second set of images with parallax, the second set of images to be used as a right side perspective in the stereoscopic image and the second set of images being combined with an overlap of the second set of images; (c) removing an appearance of a seam between a pair of images in an overlap area of the first and second set of images, said step (c) including the steps of: i) computing optical flow using horizontal disparity between corresponding objects in an overlap area, ii) cross fading left to right with a weighted factor, which factor increases from left to right, iii) cross fading right to left with a weighted factor, which factor increases from right to left, iv) warping using flows modified in steps (c)(ii) and (c)(iii), and v) applying Laplacian blend between a left half and a right half of the overlap area.

In another example, the present technology relates to a machine-readable storage medium for programming a processor to perform a method of forming a stereoscopic image from three image sensors, comprising the steps of: (a) combining together a first set of three images from the three image sensors, the first set of three images taken around 360° of a panorama to be used as a left side perspective in the stereoscopic image of the panorama, the first set of images being combined with an overlap; (b) combining together a second set of three images from the three image sensors, the second set of three images taken around 360° of a panorama to be used as a right side perspective in the stereoscopic image of the panorama, the second set of images being combined with an overlap; (c) removing an appearance of a seam between a pair of images in an overlap area of the first and second set of images, said step (c) including the steps of: i) computing optical flow using horizontal disparity between corresponding objects in an overlap area, ii) cross fading left to right with a factor weighted between 0 at left edge of overlap area and 1 at the right edge of the overlap area, iii) cross fading right to left with a factor weighted between 0 at right edge of overlap area and 1 at the left edge of the overlap area, iv) warping using flows modified in steps (c)(ii) and (c)(iii), and v) applying Laplacian blend between a left half and a right half of the overlap area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 29 is a view of a pair of left or right images to be combined.

FIG. 30 is a view of the images of FIG. 29 combined with an overlap area.

FIG. 31 is a view showing warping of the image of FIG. 30 in the overlap area in a first directional pass.

FIG. 32 is a view showing warping of the image of FIG. 30 in the overlap area in a second directional pass.

DETAILED DESCRIPTION

Embodiments of the present technology will now be described with reference to FIGS. 1-33, which in general relate to systems and methods for generating panoramic stereoscopic images. In embodiments, the present system includes hardware and software components. The hardware components include a computing device and an assembly of three or more catadioptric image sensors affixed to each other in a chassis. Each image sensor generates an image of a panorama, which may for example be a 360° view of a scene. The software components process the catadioptric image to a cylindrical image of the panorama, spatially calibrate and temporally synchronize the cylindrical images from the different image sensors to each other, separate the cylindrical images into images for the left eye and images for the right eye, and then stitch together the left eye images from the different sensors and the right eye images from the different sensors. The result is panoramic left and right views which may be displayed to a user to provide a 3D stereoscopic view of, for example, a 360° panorama.

In examples, the images used in the system may be of real events, people, places or things. As just some non-limiting examples, the images may be of a sporting event or music concert, where the user has the ability to view the event from on the field of play, on the stage, or anywhere else the image-gathering device is positioned. The hardware and software components for generating the stereoscopic panoramic view of the scene are explained below.

One example of a system 100 for capturing panoramic stereoscopic images is shown in FIGS. 1-4. The system 100 includes a catadioptric chassis assembly 104 capable of communication with a computing system 110. An embodiment of computing system 110 is explained in greater detail below with respect to FIG. 33, but in general, computing system 110 may be one or more desktop computers, laptop computers, servers, multiprocessor systems, mainframe computers, a distributed computing environment or other processing systems. The catadioptric chassis assembly 104 may communicate with computing system 110 via a physical connection or wirelessly. In embodiments, the computing system 110 may be a separate component from the assembly 104. In such embodiments, the computing system 110 may be directly connected to the assembly 104, or computing system 110 and assembly 104 may be connected via a network connection which may for example be a LAN or the Internet. In further embodiments, the computing system may be integrated as part of the catadioptric chassis assembly 104 to form a single component.

Figure 1:
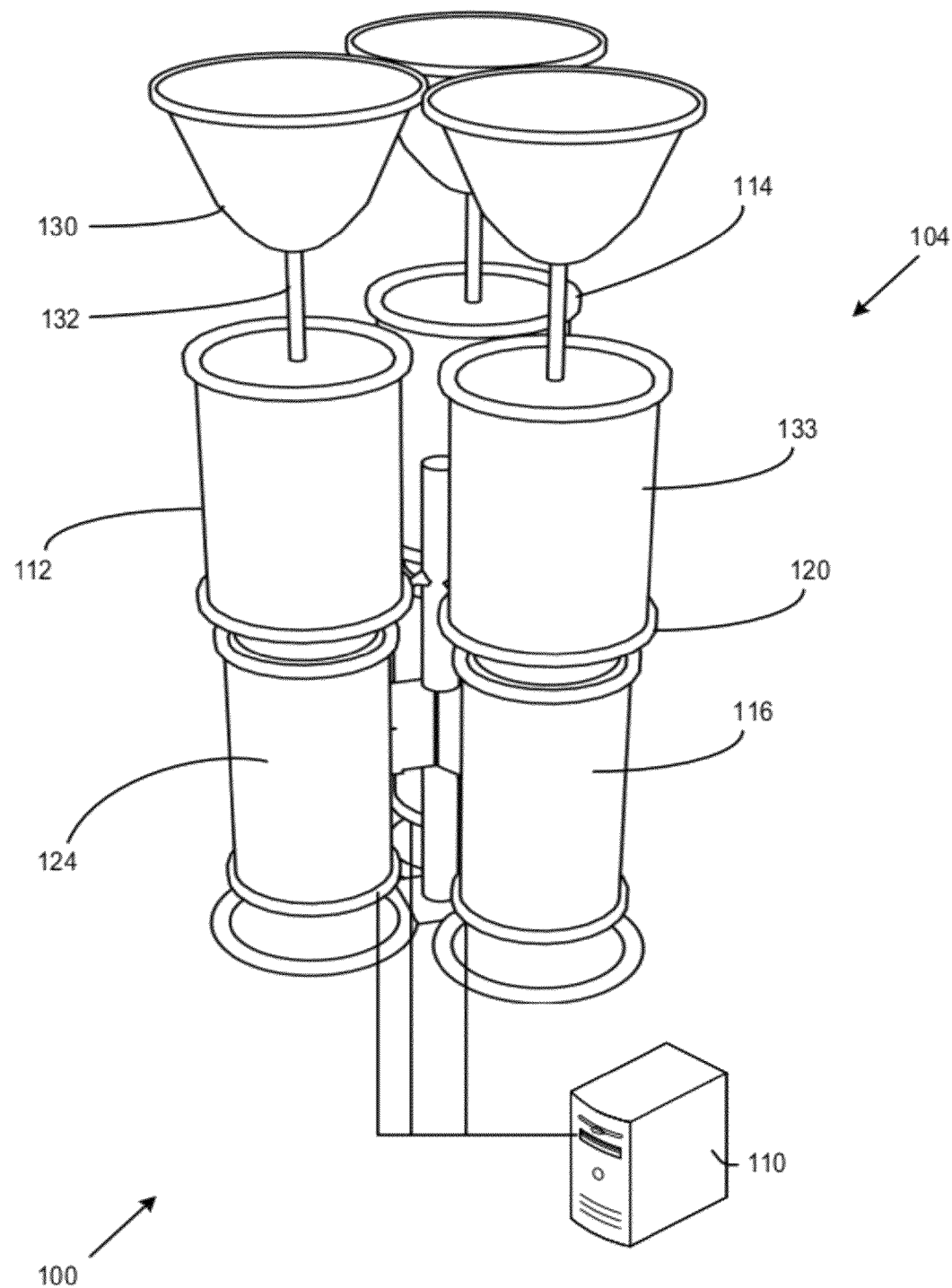
FIG. 1 is a diagram of the present system including a catadioptric chassis assembly and a computing system.
Figure 2:
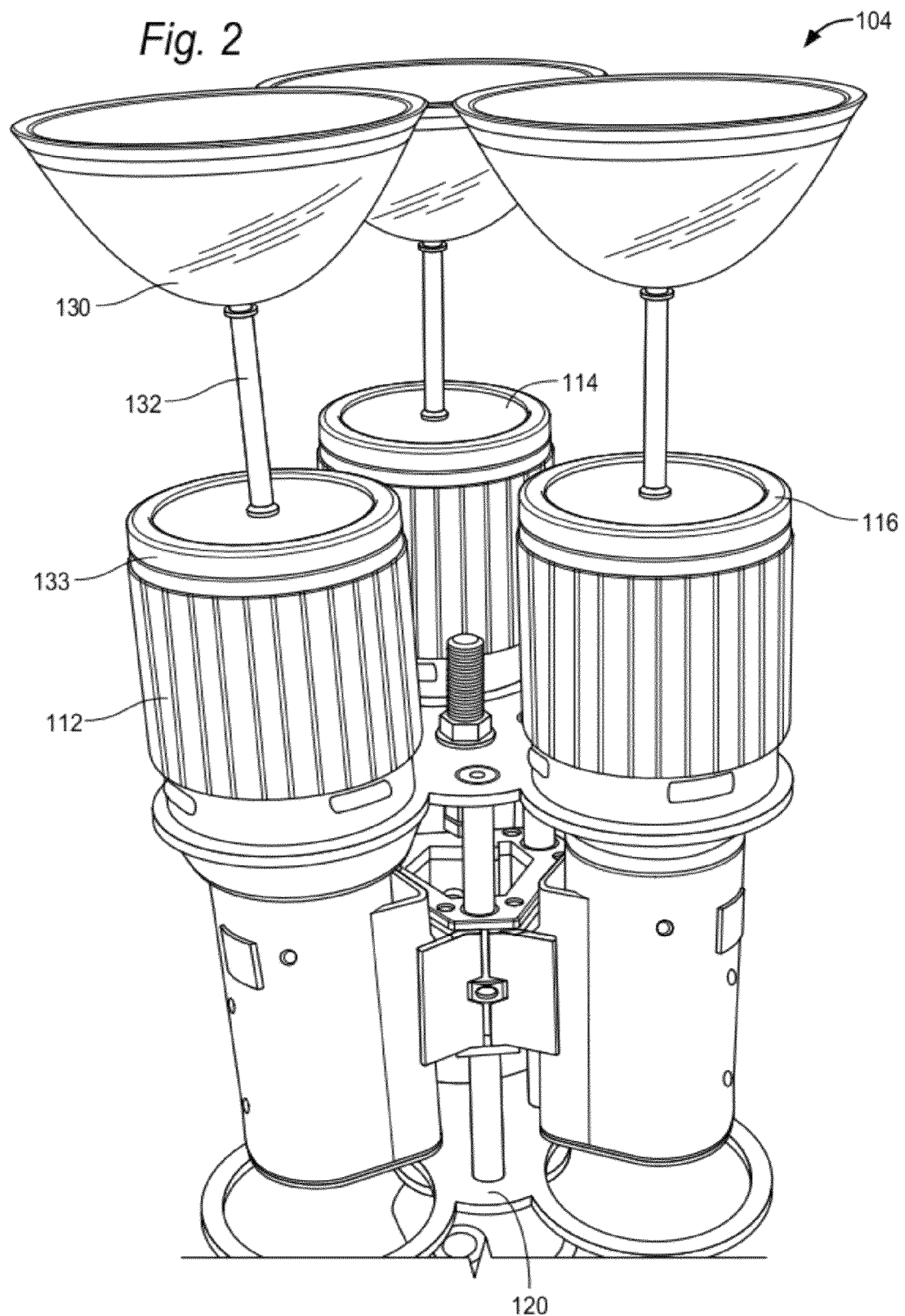
FIG. 2 is a perspective view of a catadioptric chassis assembly.
Figure 3:
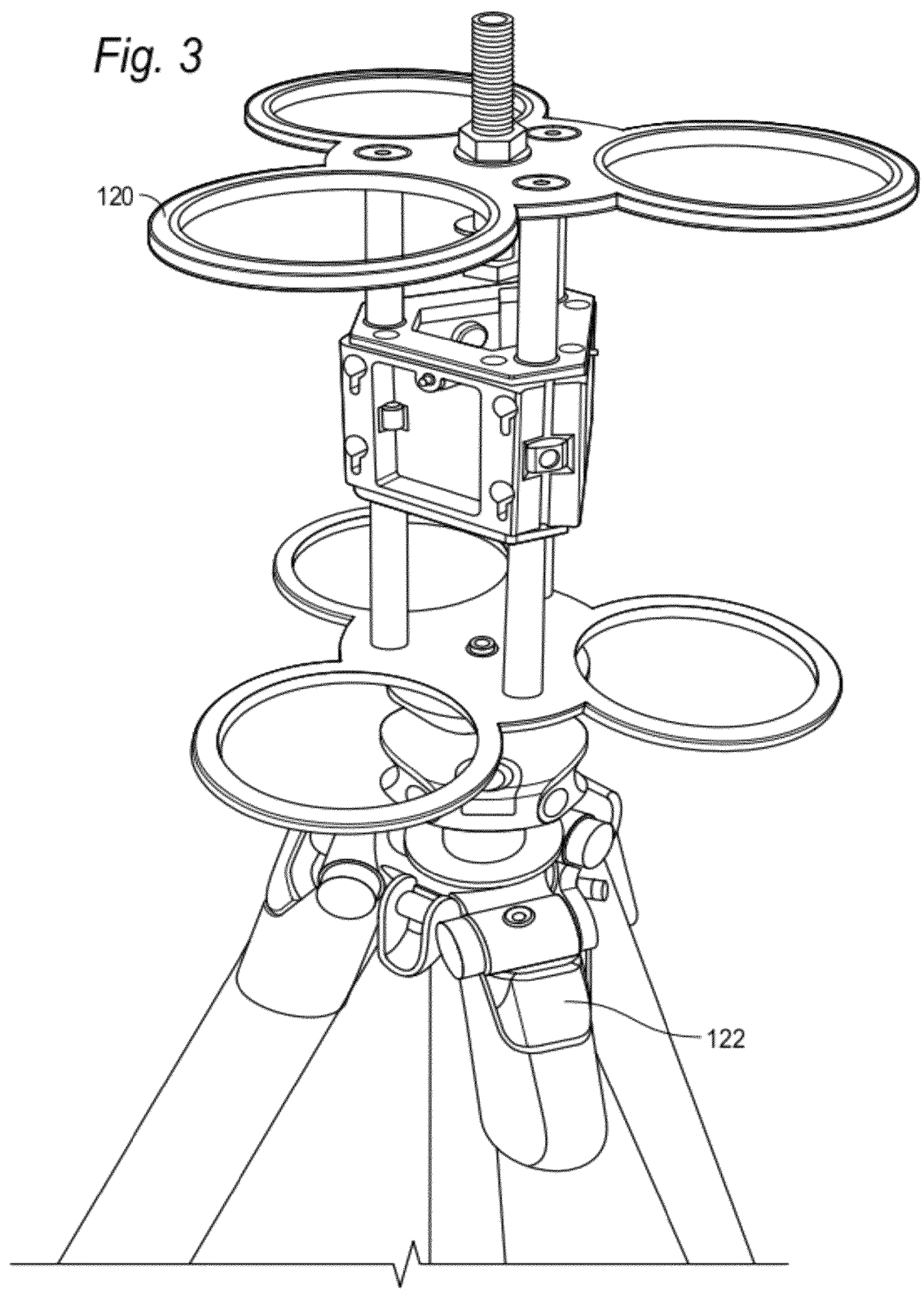
FIG. 3 is a perspective view of a catadioptric chassis.
Figure 4:
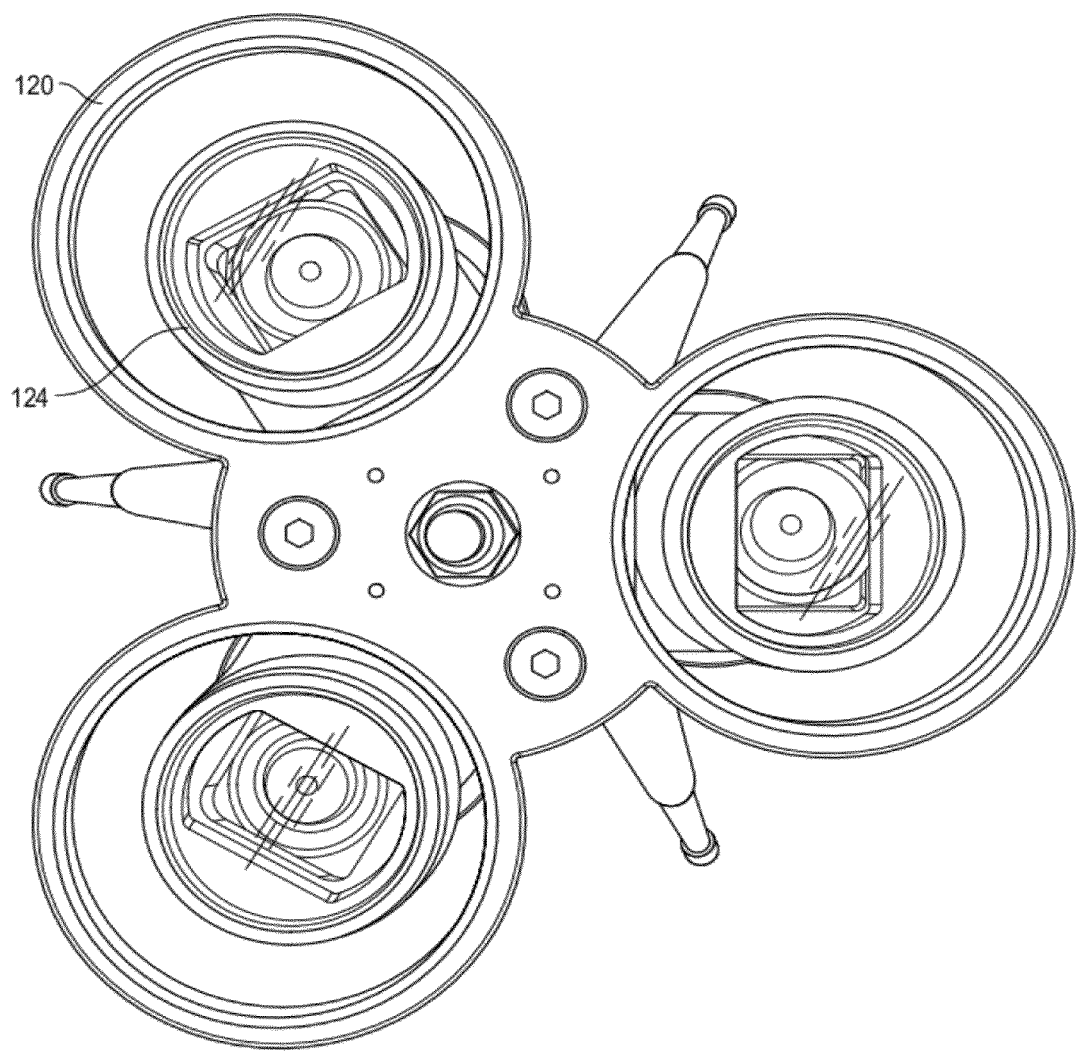
FIG. 4 is a perspective view of a portion of the catadioptric chassis assembly with the convex mirrors removed.

In the example embodiment of FIGS. 1-4, catadioptric chassis assembly 104 includes three catadioptric image sensors 112, 114 and 116. Each catadioptric image sensor may be mounted together in a chassis 120 to maintain the image sensors in a fixed relation to each other. FIG. 3 is a view of the chassis 120 without the image sensors 112, 114, 116. The chassis 120 may include receptacles into which each of the generally cylindrical image sensors 112, 114, 116 may be received and fastened, for example by one or more screws or other fasteners. Once fastened, the image sensors 112, 114 and 116 remain generally fixed with respect to each other. In the embodiment shown, the chassis 120 is configured to receive three catadioptric image sensors. As explained below, a chassis 120 may be configured to receive greater than three image sensors. The chassis 120 may for example be mounted on a tripod 122.

Each image sensor 112, 114, 116 includes a central axis, each of which is referred to herein as the optical axis of the sensor 112, 114, 116. The sensors 112, 114, 116 are fixed within chassis 120 so that the optical axes together define the vertices of an equilateral triangle. The axes of the respective sensors may form triangles of other configurations in further embodiments. The chassis 120 may be formed of metal, plastic or other rigid material. In embodiments including more than three image sensors, the chassis 120 would be configured accordingly to hold each of the image sensors in the assembly in a fixed relation to each other.

As each of the catadioptric image sensors 112, 114, 116 is identical to each other, the following description of one applies to each catadioptric image sensor in an array 104. As shown in FIGS. 1-2 and 4-6, each catadioptric image sensor may include a camera 124 and a convex mirror 130 fixedly mounted to the camera 124 via a stem 132 and collar 133. The mirror 130 includes a top portion 130a and a bottom portion 130b adjacent the stem 132. The stem 132 may be concentric about the optical axis of the catadioptric image sensor, and may support the mirror so that the bottom portion of the mirror 130b is about 7 inches away from the camera, though it may be more or less than that in further embodiments. The stem 132 may be circular with a diameter of one-quarter to one-half an inch, though it may have other diameters and may be other cross-sectional shapes in further embodiments.

The mirror 130 and stem 132 may be fixed with respect to the camera 124 by a collar 133 which may be affixed to the receptacles of the chassis 120. The mirror 130 and step 132 may be affixed to the chassis 120 and/or camera 124 by a variety of other affixation methods. One such method is disclosed in U.S. Pat. No. 7,399,095, entitled "Apparatus For Mounting a Panoramic Mirror" to Rondinelli, issued Jul. 15, 2008, which patent is incorporated herein in its entirety. Other mounting structures are contemplated for mounting the mirror to the camera in a way that minimizes the appearance of the mounting structure in the image captured by the catadioptric image sensor. The camera 124 may be a known digital camera for capturing an image and digitizing the image into pixel data. In one example, the camera may be an IIDC digital camera having an IEEE-1394 interface. Other types of digital cameras may be used.

Figure 5:
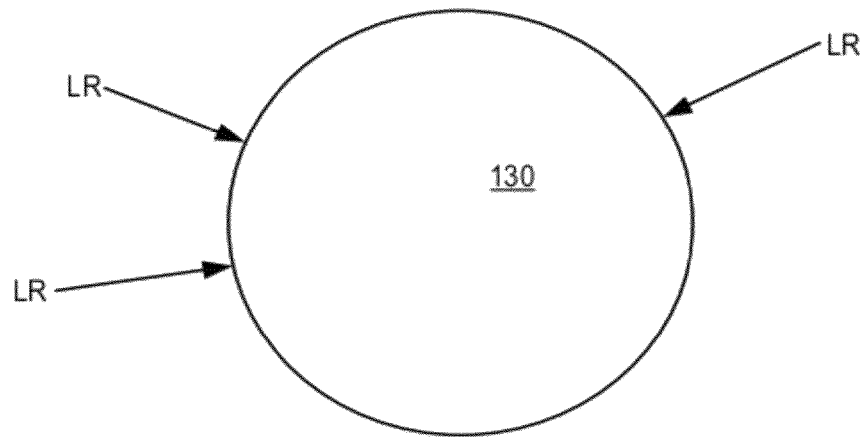
FIG. 5 is a top view of an mirror used in an image sensor of the catadioptric chassis assembly.
Figure 6:
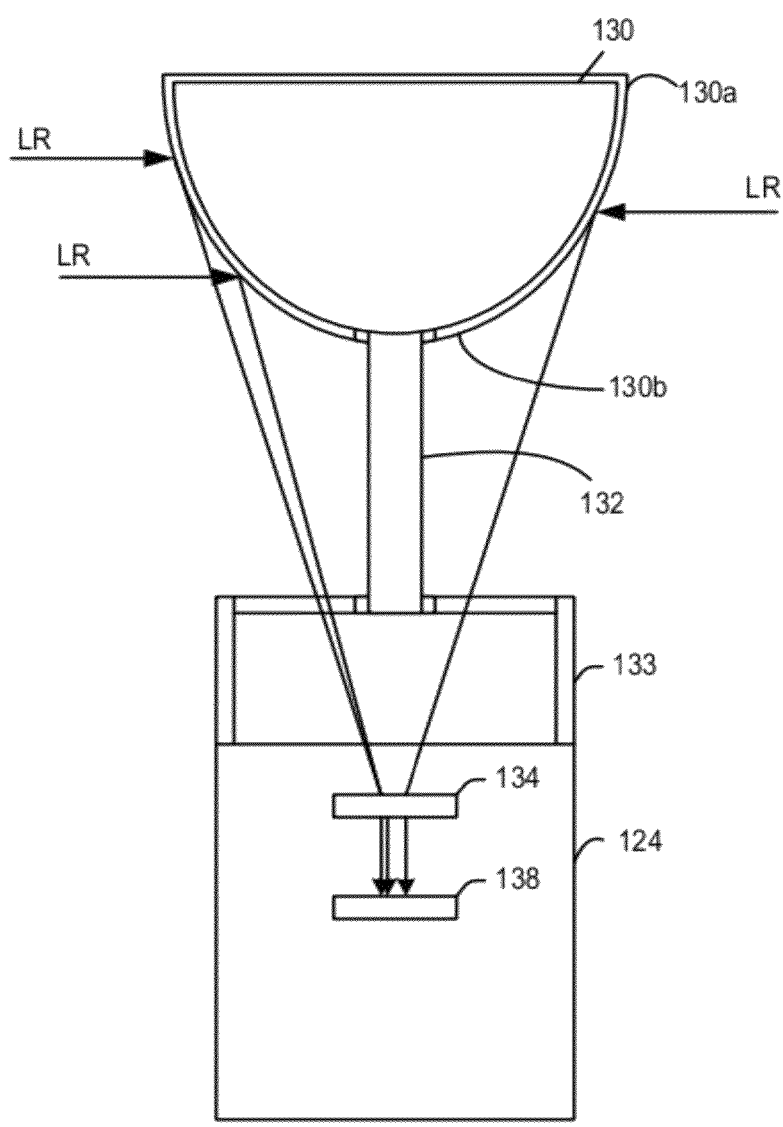
FIG. 6 is a cross-sectional side view of an image sensor of the catadioptric chassis assembly.

Convex mirror 130 may be symmetrical about the optical axis and in general may be used to capture image data from a 360° panorama and direct that image data down into the camera 124. In particular, as shown in FIGS. 5 and 6, the surfaces of mirror 130 are provided so that light rays LR incident on portions of mirror 130 are directed onto a lens 134 in camera 124. The lens in turn focuses the light rays onto an image sensing device 138 which may for example be a CCD or CMOS sensor shown schematically in FIG. 6. In embodiments described below, the panorama captured by each catadioptric image sensor 112, 114, 116 may be a 360° panorama. However, the panorama produced by the image sensors may be less than 360°, such as for example between 90° and 360°, though it may be less than 90° in further embodiments.

In embodiments, the surface of mirror 130 is symmetrical about the optical axis of the image sensor. A mirror shape may be used that is truly equi-angular when combined with camera optics. In such an equi-angular mirror/camera system, each pixel in the image spans an equal angle irrespective of its distance from the center of the circular image created by the catadioptric image sensor 112, 114, 116. Thus, radial warping of the image is uniform. The shape of the mirror may be modified in order to compensate for the perspective effect a camera lens adds when combined with the mirror, thereby providing improved high-resolution panoramic images. Further details regarding one example of a shape of convex mirror 130 are set forth in U.S. Pat. No. 7,058,239, entitled "System and Method for Panoramic Imaging" to Singh et al., issued Jun. 6, 2006, which patent is incorporated by reference herein in its entirety. Some details of the shape of mirror 130 are provided below.

FIGS. 5 and 6 show the geometry of an example of an equi-angular mirror 130. The reflected light ray LR is magnified by a constant gain, α, irrespective of location along the vertical profile of the mirror 130. The general form of these mirrors is given in equation (1):

$$\cos\left(\theta \frac{1+\alpha}{2}\right) = \left(\frac{r}{r_0}\right)^{-(1+\alpha)/2} \tag{1}$$

For different values of α, mirrors can be produced with a high degree of curvature or a low degree of curvature, while still maintaining their equi-angular properties. In one embodiment, α ranges from about 3 to about 15, and may for example be 11. One advantage of these mirrors is a constant resolution in the image data. In embodiments, the top portion 130a of mirrors 130 may have a 3 inch diameter, and the height of the mirror 130 from top portion 130a to bottom portion 130b may be 2 inches. This diameter and height may vary above and/or below those values in further embodiments.

It has been determined that the addition of a camera with a lens introduces an effect such that each pixel does not span the same angle. This is because the combination of the mirror and the camera is no longer a projective device. Thus, to be truly equi-angular, the mirror may be shaped to account for the perspective effect of the lens and the algorithms may be modified. Examples on how Equation (1) set forth above may be modified to account for the effect of the lens are set forth in the above-identified U.S. Patent Publication No. 2003/0095338, which examples are incorporated by reference herein.

One advantage of a mirror 130 having surfaces conforming to these convex contours is that they result in a constant resolution in the image data. This allows for straightforward mathematical conversion and inexpensive processing to convert, or un-warp, the circular image obtained by each catadioptric image sensor 112, 114, 116 into a cylindrical image having linear x-axis and y-axis components. However, it is understood that the mirror surface may conform to a variety of other contours in further embodiments. In such further embodiments, known mathematical equations may be used to convert the resulting circular image obtained by each catadioptric image sensor into a cylindrical image having linear x-axis and y-axis components.

In embodiments, mirror 130 may be made of Pyrex® glass coated with a reflective surface made of aluminum, and with a protective coating of for example silicon. It is understood that mirror 130 may be made from other materials and other reflective surfaces and/or coatings in further embodiments. In one example, the smoothness of the mirror is ¼ of the wavelength of visible light, though again, this may vary in further embodiments.

Figure 7:
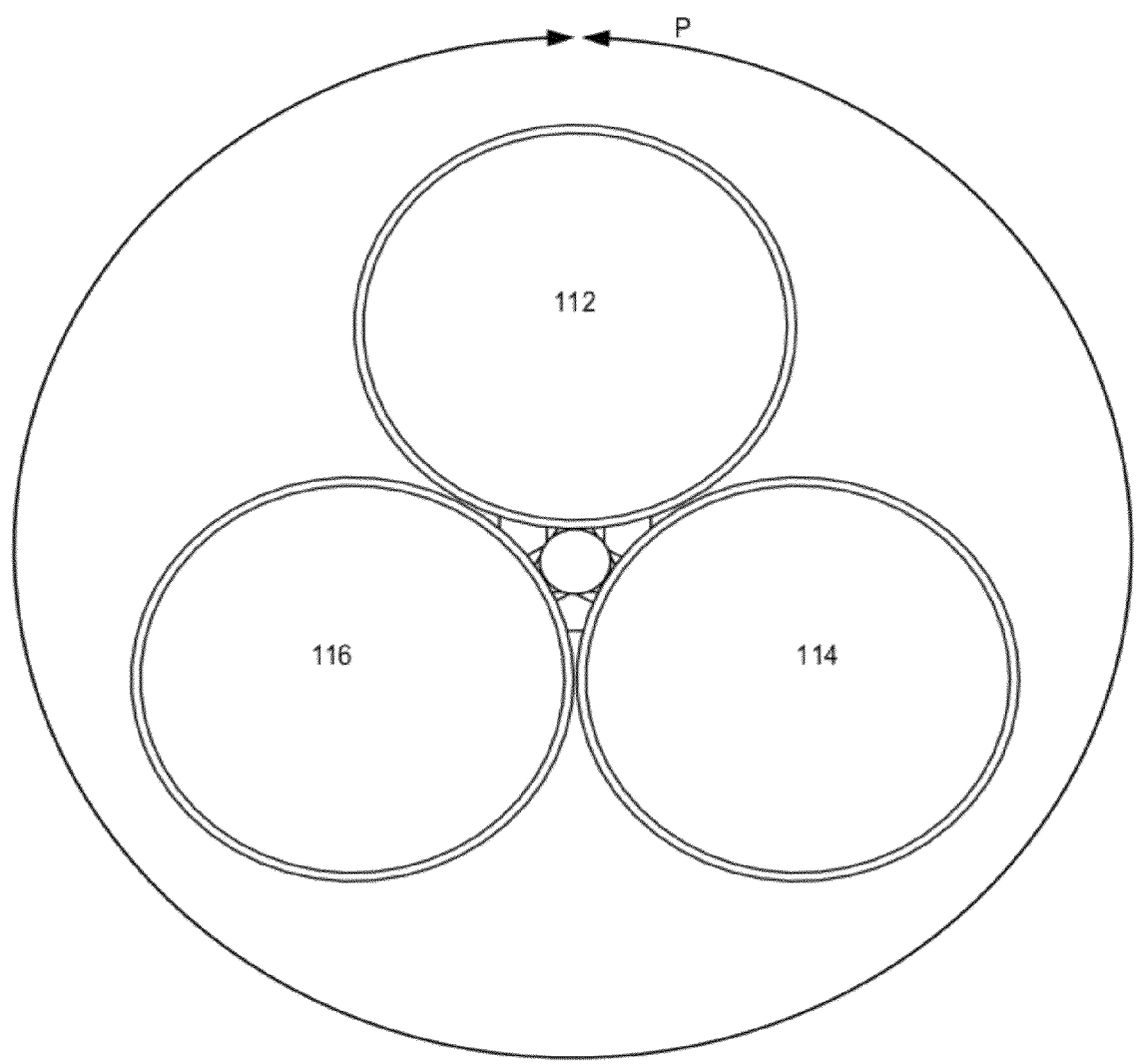
FIG. 7 is a top view of the catadioptric chassis assembly capturing a view of a panorama.

FIG. 7 shows a top view of an example of a catadioptric chassis assembly 104 with the three catadioptric image sensors 112, 114 and 116. Each of the image sensors captures an image of the surrounding panorama P. As explained below, one feature of assembly 104 including three or more image sensors is that views of a surrounding panorama P may be selected from at least two different image sensors in the assembly 104 so as to provide an unobstructed stereoscopic view of the 360° panorama P from the image sensors in every direction. For example, as shown in the top view of FIG. 8, image sensors 112 and 114 may be used to provide an unobstructed view of a portion P1 of the panorama P; image sensors 114 and 116 may be used to provide an unobstructed view of a portion P2 of the panorama P; and image sensors 116 and 112 may be used to provide an unobstructed view of a portion P3 of the panorama P. Portions P1, P2 and P3 together form a 360° view of the panorama. In embodiments, each of the segments P1, P2 and P3 may be 120°, but need not be in further embodiments.

In general, as described in the Background section, in order to provide a stereoscopic image, two images are taken from different views: a left side view and right side view. When the left and right side views are offset by a parallax differential approximating the interocular distance of the human eyes, the left side image may be displayed to the left eye and the right side image may be displayed to the right eye. The resulting combined image (if also properly calibrated and synchronized) may be interpreted by the brain as having stereoscopic depth.

In order to provide this stereoscopic effect using the image sensors of assembly 104, a given image sensor will provide the left side image when capturing a first portion of the panorama, and the same image sensor will provide the right side image when viewing a second portion of the panorama. The determination of which of two image sensors provides the left and right side images of a given portion of the panorama will depend on which image sensor is on the left and which is on the right with respect to light rays coming in from that portion of the panorama.

Figure 8:
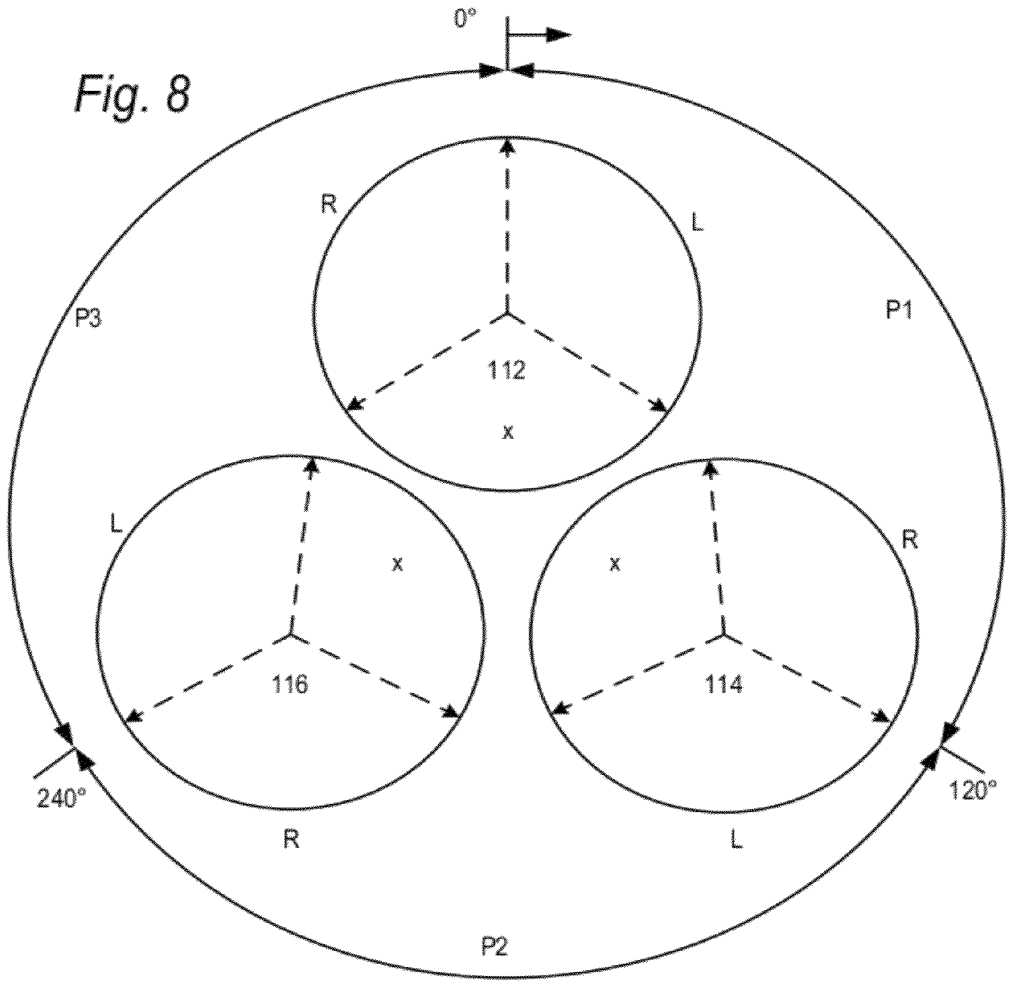
FIG. 8 is a top view of the catadioptric chassis assembly capturing views of different portions of the panorama of FIG. 7.

For example, referring now to FIG. 8, when image sensors 112 and 114 are used to capture the image portion P1 of the panorama, the image sensor 114 is on the right side with respect to incoming light rays and as such, the image sensor 114 provides the right side image for portion P1. However, when image sensors 114 and 116 are used to capture the image portion P2 of the panorama, the image sensor 114 is on the left side with respect to incoming light rays and as such, the image sensor 114 provides the left side image for portion P2. When the assembly 104 is used to capture the image portion P3, the view from image sensor 114 would include, and be obstructed by, the image sensors 112 and 116, and thus, image sensor 114 is not used when capturing the view of portion P3 of the panorama. More detail of the structure and operation of the system 110 for obtaining panoramic images and processing them into a stereoscopic panoramic view is provided below.

Figure 9:
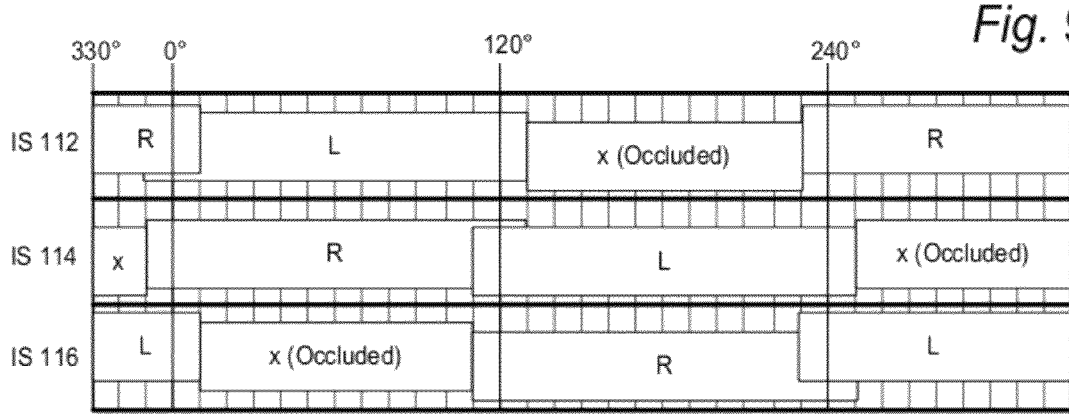
FIG. 9 is a chart showing the left, right and occluded views of the images sensors of the catadioptric chassis assembly of FIG. 8.

FIG. 9 shows a chart of the images captured by image sensors 112, 114, 116 around a 360° panorama of FIG. 8, where the origin (0°) is arbitrarily selected as being between P3 and P1. As shown, for the configuration of FIG. 8, image sensor 112 will provide left side image data for portion P1, will be occluded for portion P2 and will provide right side image data for portion P3. Image sensor 114 will provide right side image data for portion P1, left side image data for portion P2 and will be occluded for portion P3. And image sensor 116 will be occluded for portion P1, will provide right side image data for portion P2 and will provide left side image data for portion P3. Areas within FIGS. 8 and 9 marked with an "x" represent views from that image sensor which may be obscured by another image sensor and consequently are not used, when generating the stereoscopic panoramic view. It is appreciated that other camera configurations will result in a different breakdown of left, right and occluded image data as the image sensors view different portions of the panorama.

In the three-sensor embodiment shown in FIG. 8, it is possible to have the left image span 120°, the right image span 120°, and the occluded area be 120°. However, as explained below, when the left images from each image sensor are combined, and the right images from each image sensor are combined, it is desirable to provide an overlap in the images where stitching and blending may occur. In embodiments, the left and right image segments may have some degree of overlap, as shown in FIG. 9. Moreover, the span of the left and right images may be increased by decreasing the angular size of the area used as the occluded area x, as also shown in FIG. 9. The degree of overlap may vary, but may for example be 10° to 20° of overlap. The overlap may be greater or lesser than that in further embodiments.

The amount by which the occluded area x may be decreased depends on the size and spacing of the mirrors used in the image sensors 112, 114, 116. This point is now explained with reference to the example of FIG. 8A. The example illustrates the sizing and spacing with respect to the image sensor 112, but the same would apply to the image sensors 114 and 116. The right image from image sensor 112 can extend to a line j tangent to the sensor 116. Beyond that, the right image would include a view of the image sensor 116. Similarly, the left image from the sensor 112 can extend to a line k tangent to the sensor 114. Beyond that, the left image would include a view of the image sensors 114.

Figure 8A:
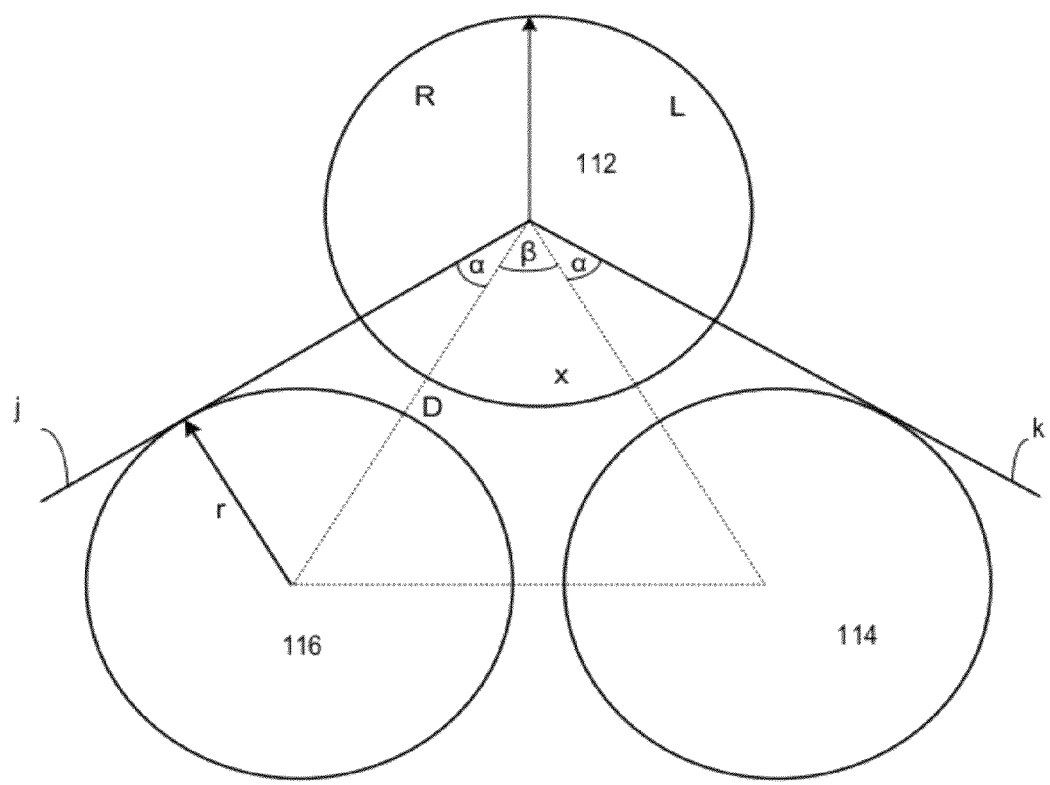
FIG. 8A is an illustration of the catadioptric chassis assembly of FIG. 7 showing calculation of an occlusion angle.

In FIG. 8A, r is the radius $r_{max}$ of a mirror, and D is the center-to-center distances between mirrors. The occlusion angle (in degrees) defining the occluded area x is given by angles $\alpha+\beta+\alpha$, where:

$\alpha = \sin^{-1}(r/D)$, and $\beta = 180(1-(2/N))$, with $N$ equal to the number of mirrors.

Thus, the occlusion angle is given by the equation:

$2\sin^{-1}(r/D) + 180(1-(2/N))$. (2)

It can be seen from the above equation that where the three mirrors of image sensors 112, 114 and 116 touch each other so that D=2r, the occlusion angle given by equation (2) would be 120°. However, where there is a space between the mirrors so that D is greater than 2r, the occlusion angle will be less than 120°, allowing the left and right images a greater span for overlap as shown in FIG. 9. The desired overlap may be set by selecting the size and spacing of the mirrors.

Figure 10:
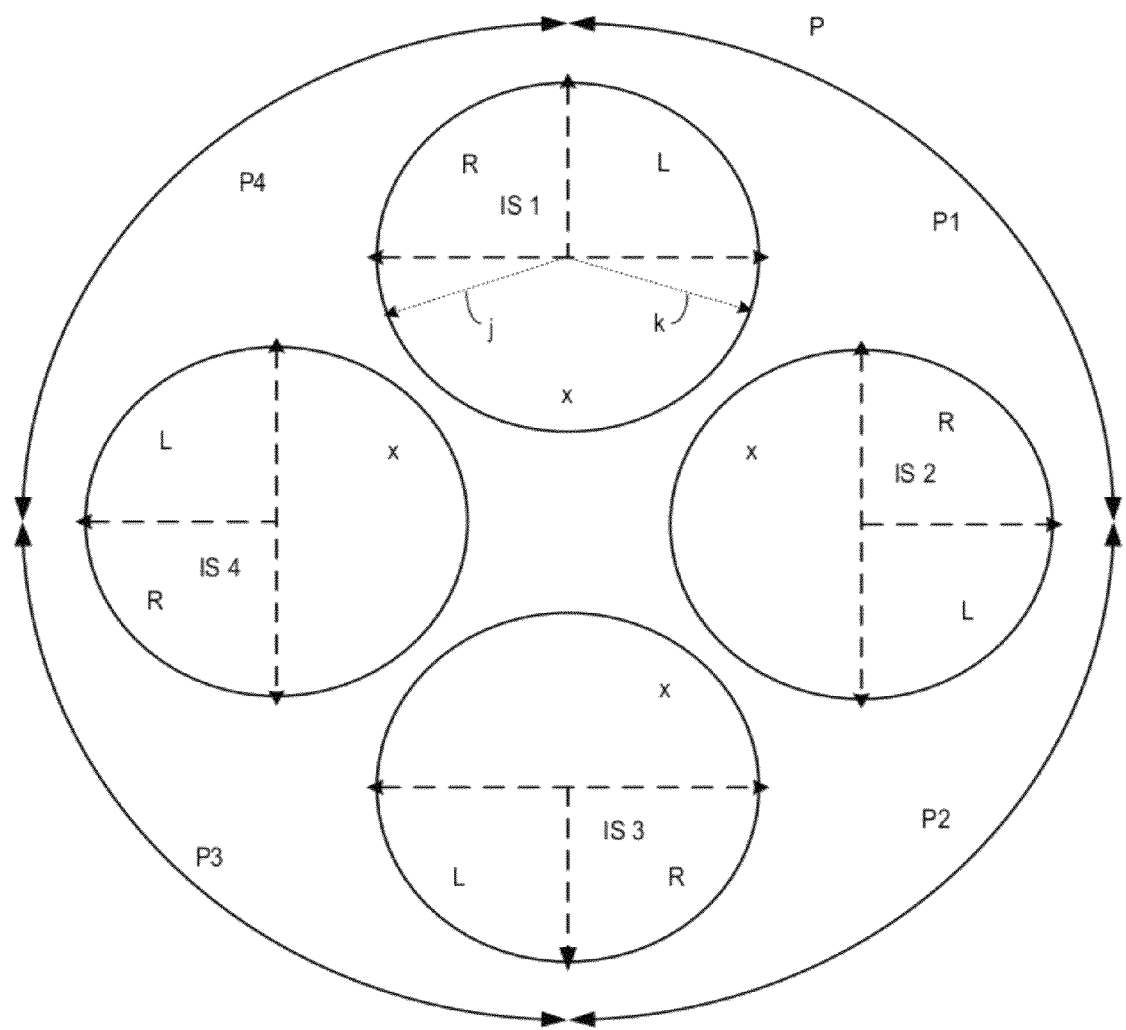
FIGS. 10-12 are top views of catadioptric chassis assemblies according to alternative embodiments of the present system.

As noted, catadioptric chassis assembly 104 may include more than three image sensors in further embodiments. FIG. 10 is a top view of a catadioptric chassis assembly 104 including four image sensors, labeled IS1, IS2, IS3 and IS4. Image sensors 1 and 2 may be used to provide an unobstructed view of a portion P1 of the panorama P; image sensors 2 and 3 may be used to provide an unobstructed view of a portion P2 of the panorama P; image sensors 3 and 4 may be used to provide an unobstructed view of a portion P3 of the panorama P; and image sensors 4 and 1 may be used to provide an unobstructed view of a portion P4 of the panorama P. In embodiments, each of the segments P1, P2, P3 and P4 may each be 90°, but need not be in further embodiments. Each image sensor may be used to provide a left side view or a right side view, depending on which portion is being captured. For example, image sensor 3 provides a right side view when capturing P2, but a left side view when capturing P3.

In embodiments, in a configuration of four mirrors, in order to provide an overlap area for stitching of images, the angle spanned by the left and right images should be greater than 90° (360°/4). The span of the left and right images may be increased by overlapping each other. Alternatively or additionally, the area of occlusion x may be smaller than 180°. In particular, as shown with respect to image sensor 1, the angle spanned by the right image may be increased up to the line j, and the left image may be increased up to the line k. While only shown for image sensor 1, this applies to each image sensor 1-4. As described above, the line j is tangent to the adjacent image sensor 4, and the line k is tangent to the adjacent sensor 2. The size and shape of the mirrors in the image sensors 1-4 may be selected to define an occluded area by equation (2) above. The amount of occluded area will in part define the allowable span of the left and right images.

Figure 11:
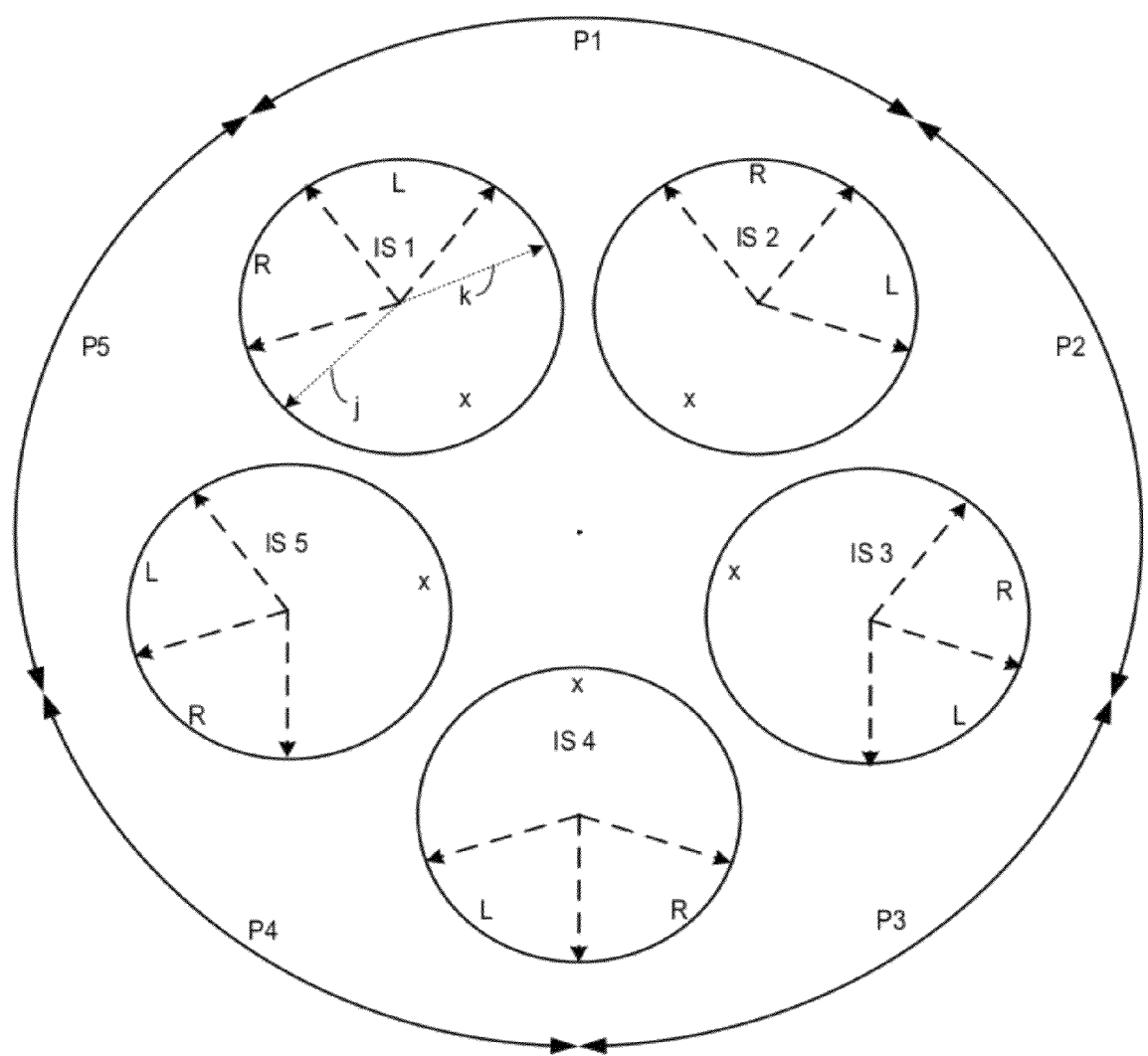

Other configurations are known. FIG. 11 shows a top view of a catadioptric chassis assembly 104 including image sensors 1-5. Adjacent image sensor pairs may be used to capture five different portions P1-P5 as shown in FIG. 11. Each image sensor may be used to provide a left side view or a right side view, depending on which portion is being captured. For example, image sensor 5 provides a right side view when capturing P5, but a left side view when capturing P1. An overlap between left and right images may be provided. Moreover, the area of occlusion x may be shrunk to an angle bounded by lines j and k (tangent lines to image sensors 5 and 2, respectively). This further allows the span of the left and right images to be increased. While shown only on image sensor 1, the occlusion area shown for image sensor 1 may apply to each of the image sensors 1-5.

Figure 12:
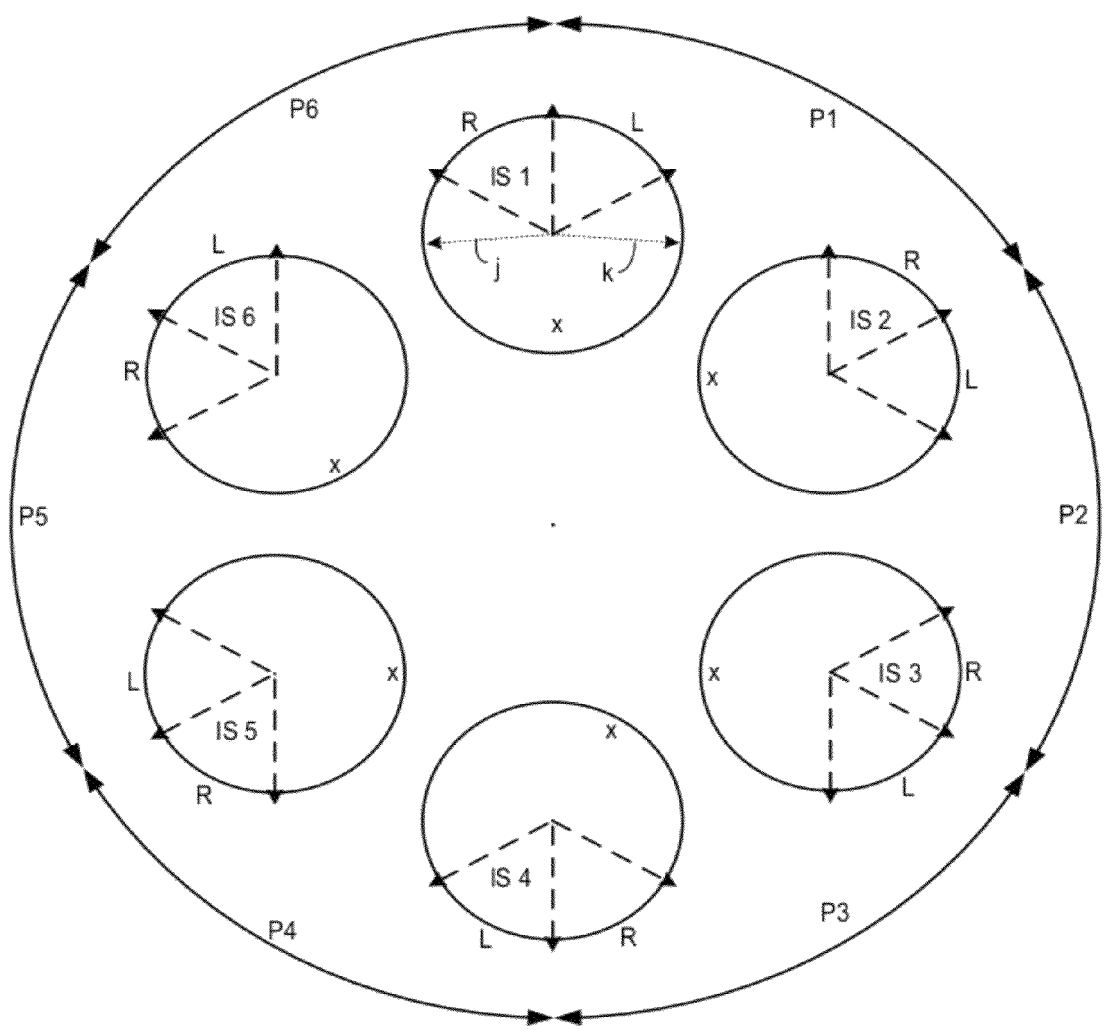

A further configuration is shown in FIG. 12, which includes a top view of a catadioptric chassis assembly 104 including image sensors 1-6. Adjacent image sensor pairs may be used to capture six different portions P1-P6 as shown in FIG. 12. Each image sensor may be used to provide a left side view or a right side view, depending on which portion is being captured. For example, image sensor 4 provides a right side view when capturing P3, but a left side view when capturing P4. An overlap between left and right images may be provided. Moreover, the area of occlusion x may be shrunk to an angle bounded by lines j and k (tangent lines to image sensors 6 and 2, respectively). This further allows the span of the left and right images to be increased. While shown only on image sensor 1, the occlusion area shown for image sensor 1 may apply to each of the image sensors 1-6.

The embodiments set forth in FIGS. 1-12 are by way of example only. It is understood that further catadioptric chassis assemblies 104 may include more than six image sensors in further embodiments. Moreover, where embodiments of a catadioptric chassis assembly 104 have the different image sensors aligned with each other in a plane perpendicular to the optical axes of each image sensor, it is contemplated that one or more of the image sensors may be out of plane with respect to one or more other image sensors; that is, one or more image sensors may be shifted upward or downward along its optical axis relative to one or more other image sensors.

Furthermore, while the optical axes of all image sensors in a catadioptric chassis assembly 104 may be parallel to each other, it is contemplated that the optical axes of one or more of the image sensors may be tilted toward or away from the optical axes of one or more of the remaining image sensors. For example, the optical axes of the image sensors may tilt toward each other an angle of between 0° and 45°. The embodiments described below are described with respect to an assembly 104 having three image sensors 112, 114 and 116. However, the following description also applies to assembly 104 having greater than three image sensors.

Additionally, while embodiments of the present technology include mirrors 130 as described above, alternative embodiments may capture images around 360° of the panorama without mirrors. In particular, the cameras 124 may include wide angle lenses, so that an embodiment including for example three such image sensors may capture three images of the panorama, each around 360°. Thereafter the captured images may be resolved into a cylindrical image as explained below.

Figure 13:
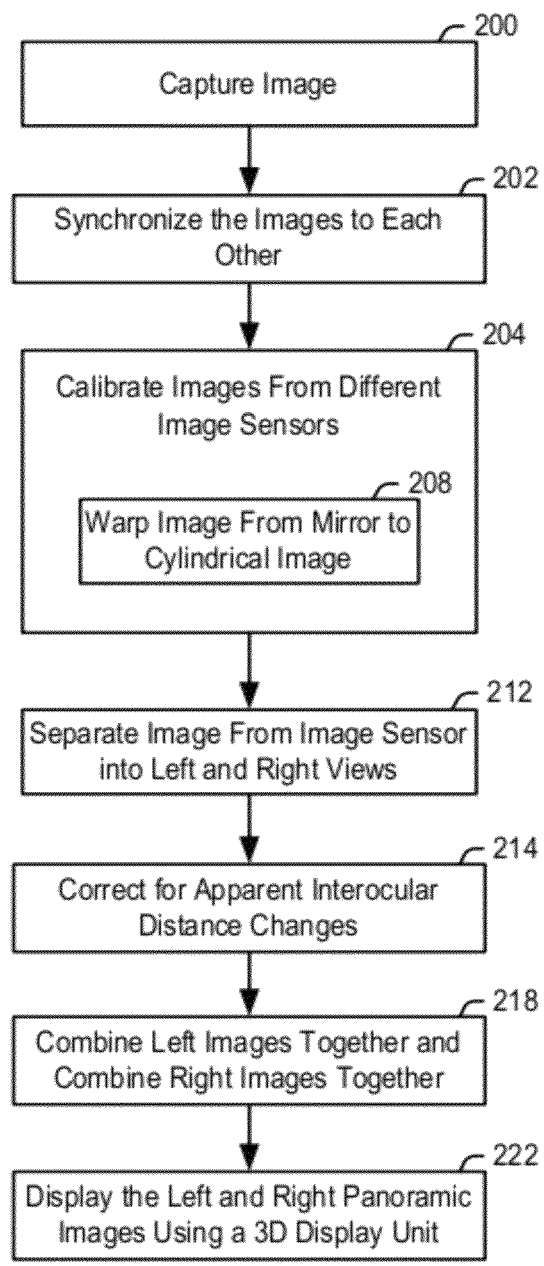
FIG. 13 is a flowchart of the operation of an embodiment of the present system.
Figure 14:
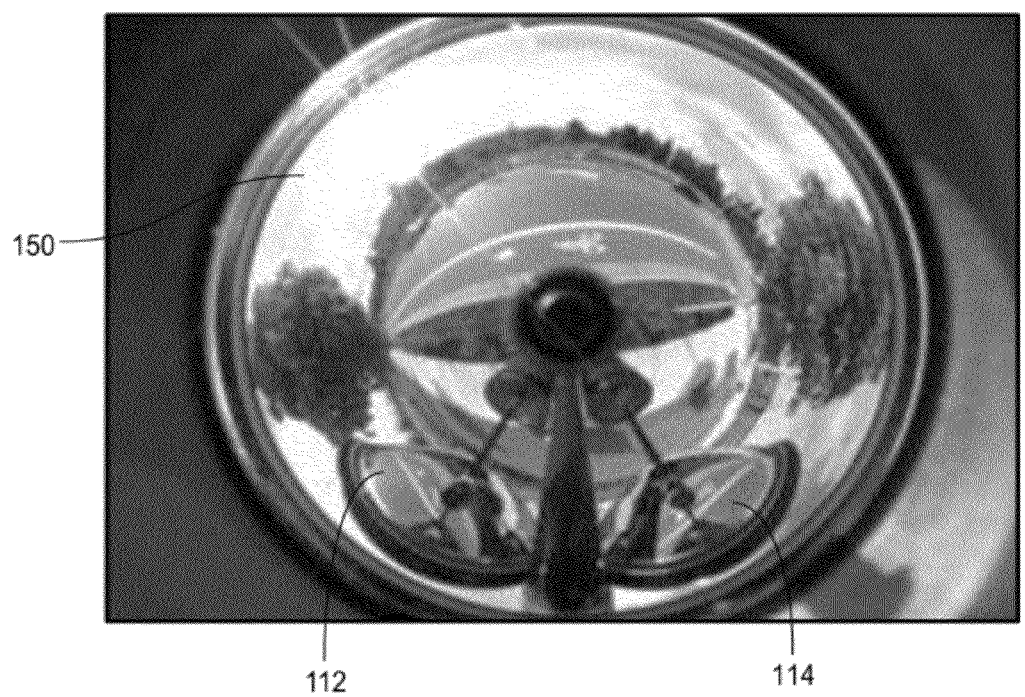
FIG. 14 is a bottom view of a convex mirror capturing a catadioptric image.

FIG. 13 is a high level flowchart showing the generation of left and right panoramic images from the catadioptric images captured by the image sensors of a catadioptric chassis assembly 104. In step 200, the image sensors 112, 114, 116 of the catadioptric chassis assembly 104 capture catadioptric image data. As described above, each image sensor in a catadioptric chassis assembly 104 captures an image of a surrounding panorama P, for example around a 360° panorama. FIG. 14 shows the catadioptric image 150 obtained by one of the image sensors 112, 114, 116 of the 360° panorama P. Light rays from 360° around the image sensor are incident on the mirror 130 and reflected down into the camera 124 to create the catadioptric image 150. The catadioptric image 150 includes the panorama P, as well as the images of other sensors in the assembly 104. For example, where the image shown in FIG. 14 is generated by image sensor 116, the images of sensors 112 and 114 are visible in the captured image.

In step 202, the images from each of the image sensors may be time synchronized to each other, and step 204 is the calibration step that recovers the capture system parameters. These parameters are necessary to map pixels from the input images to the output stereoscopic cylindrical images. As explained below, in embodiments, the steps of FIG. 13 may be performed once every frame to provide stereoscopic video images. In such embodiments, the synchronization step 202 need only be performed once. Once the image sensors are synchronized with each other, there is no need to repeat that step for each frame. However, the synchronization step may be performed each frame in further embodiments. Similarly, it is contemplated that the calibration step may only be performed once. For example, the calibration step may be performed in a controlled environment, with controlled images in step 204. Once the images are calibrated with each other, there is no need to repeat that step each frame. However, unlike the time synchronization step, the calibration of the image sensors to each other is more likely to change, for example if the image sensors are jarred, dropped or otherwise moved with respect to each other. Therefore, the calibration step 204 may be performed each frame in further embodiments (either in the controlled environment and then in live use outside of the controlled environment, or simply in live use outside of the controlled environment).

Further details of a suitable synchronization operation of step 202 are disclosed in applicant's co-pending U.S. patent application Ser. No. 12/772,802, entitled "Heterogeneous Image Sensor Synchronization," filed May 3, 2010, which application is incorporated herein by reference in its entirety. However, in general, known genlock techniques may be used and/or each of the image sensors 112, 114, 116 may be tied to a common clock, either in the catadioptric chassis assembly 104 or in computing device 110. Using a common clock, the system can ensure that when images from the different image sensors are combined, the images are each taken from the same instance of time. In embodiments, the synchronization step may be omitted if the image sensors are all genlocked or hardware synchronized.

Calibration step 204 of FIG. 13 includes a step 208 of warping the catadioptric image obtained in the camera 124 to a cylindrical image. In particular, the bottom portion 130b of the mirror 130 receives the same amount of light rays from the panorama P as the top mirror portion 130a. However, the bottom portion 130b is smaller than the top portion 130a. Consequently, the panoramic image data generated by the bottom portion 130b of mirror 130 is more condensed than the catadioptric image data generated from the top portion 130a. Details of an algorithm for warping the catadioptric image into a cylindrical image (also referred to as unwarping the catadioptric image into a cylindrical image) are disclosed in the above-mentioned U.S. Pat. No. 7,058,239. Further details are also disclosed in U.S. Pat. No. 6,856,472, entitled "Panoramic Mirror and System For Producing Enhanced Panoramic Images," issued Feb. 15, 2005, which patent is further incorporated by reference herein in its entirety.

Figure 15:
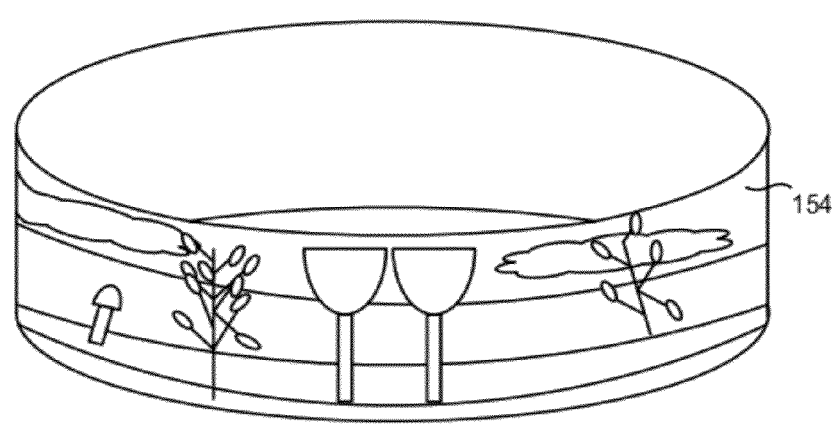
FIG. 15 is a perspective view of a cylindrical image warped from the catadioptric image of FIG. 14.
Figure 17:
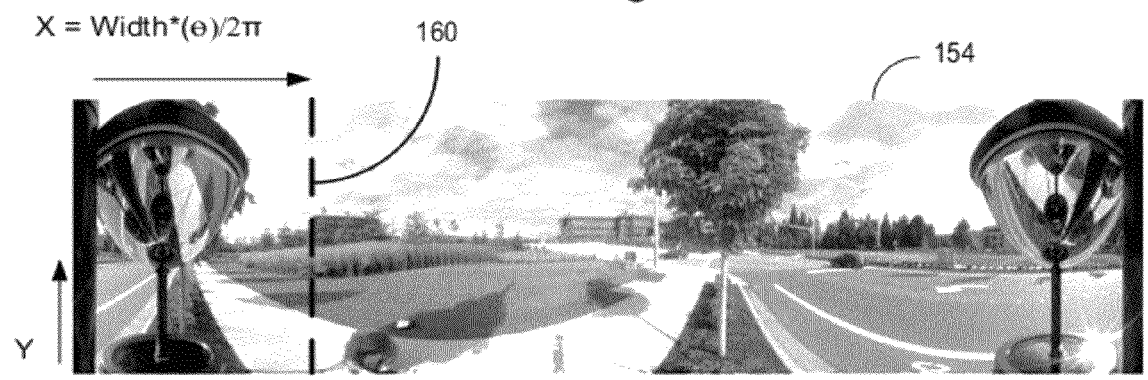
FIG. 17 is a flattened view of the cylindrical image of FIG. 15.
Figure 18:
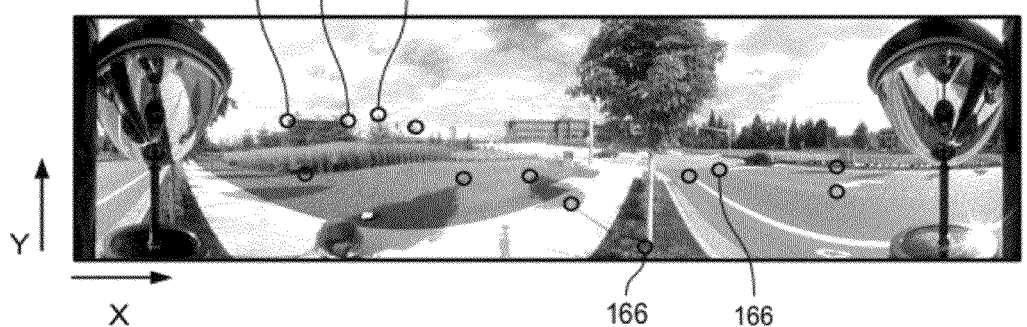
FIGS. 18-20 are cylindrical images captured by three image sensors and showing cues which may be matched between the different images for calibration purposes.

FIG. 15 shows a schematic representation of the catadioptric image data of FIG. 14 warped into a cylindrical image 154. The cylindrical image 154 may result from an equi-angular or an equi-rectangular projection of the catadioptric image 150. FIG. 17 shows the cylindrical image 154 of FIG. 15 flattened out into a two-dimensional representation of the cylindrical image data. Although shown as a flat, two-dimensional image on FIG. 17, the cylindrical image 154 represents a panoramic, 360° view with the leftmost and rightmost portions being images of the same area of the panorama.

Figure 16:
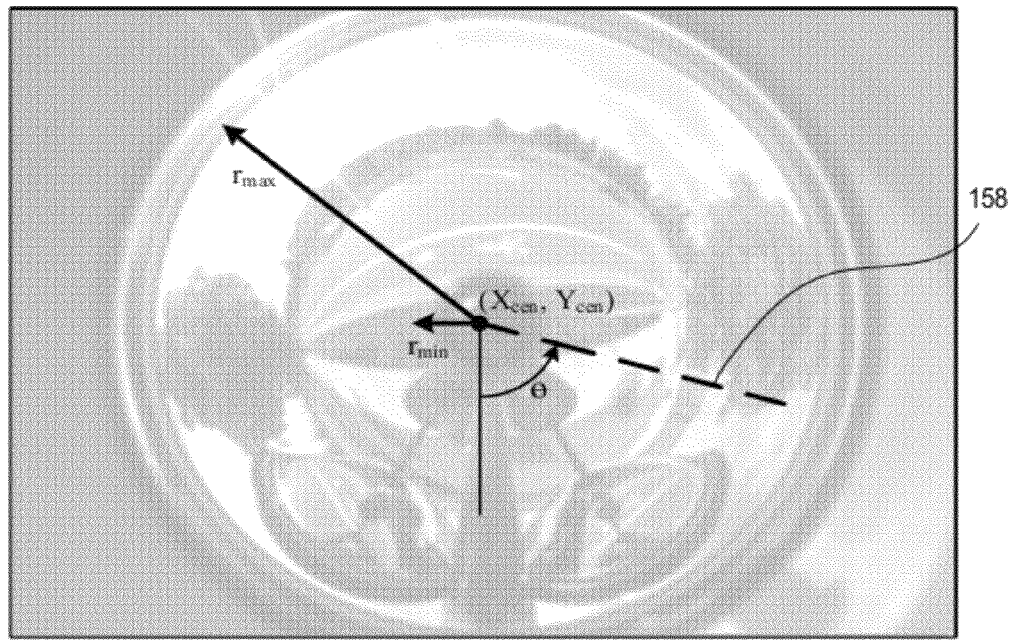
FIG. 16 is a bottom view of the convex mirror of FIG. 14 showing various parameters of the convex mirror.

FIG. 16 is an illustration of the catadioptric image 150 of FIG. 14, with indications of the image center ($x_{cen}$, $y_{cen}$), the minimum radius $r_{min}$ (from center to edge of projected mirror stem), and maximum radius $r_{max}$ (from center to outer edge of the mirror). A radial line 158 in the catadioptric image passing through ($x_{cen}$, $y_{cen}$) from $r_{min}$ to $r_{max}$ maps to a vertical line 160 in the cylindrical image as shown in FIG. 17.

Given the width of the cylindrical image w, for an image sensor, a radial line 158 subtending an angle θ (anti-clockwise direction) is mapped to the vertical line 160 by the equation:

$$x = w*(\theta)/2\pi.$$

The distance x along the width dimension ranges from 0 to the full width w.

As noted above, in embodiments, the shape of the mirror is equi-angular. An advantage to such a shape is that the warping between radial line 158 and the vertical line 160 along the x and y directions are linear. That is, the y-coordinate (y=0 at the bottom) corresponds to:

$$y = h*(r-r_{min})/(r_{max}-r_{min})$$

where h is the height of the cylindrical image. The distance y along the height dimension varies from 0 to the full height h (at $r=r_{max}$). As noted above, the shape of the mirror may not be equi-angular in further embodiments. In such embodiments, known equations may be derived for warping a radial line 158 in the catadioptric image to a vertical line 160 in the cylindrical image.

The mapping from catadioptric to cylindrical data for the second and third image sensors is the same as described above for the first image sensor, with the exception of adding fixed angular shifts to account for the relative orientations of the second and third image sensors with respect to the first image sensor.

Calibration step 204 further includes vertically aligning the images from the different image sensors 112, 114, 116. In particular, as explained below, portions of the images from the different image sensors are combined with each other. Even where the image sensors are initially calibrated to each other, movements, jarring or misalignment may result in the images from the different image sensors becoming mis-calibrated. Calibration is performed to ensure alignment of the images in the vertical direction (along the y-direction), as misalignment in the y direction can impact the stereoscopic effect. Calibration is not as critical in the horizontal direction (along the x-direction) as the images are purposefully offset from each other a distance approximating the interocular distance to create the illusion of depth and the 3D effect.

As noted above, calibration may be performed once or periodically, for example where the catadioptric chassis assembly 104 is stationary. Alternatively, calibration may be performed for each frame of capture image data from the image sensors 112, 114, 116, for example where the catadioptric chassis assembly 104 is stationary or moving. In embodiments, the catadioptric chassis assembly 104 may include image stabilization hardware and/or software to minimize any disparity between the images captured by the image sensors 112, 114, 116.

Figure 19:
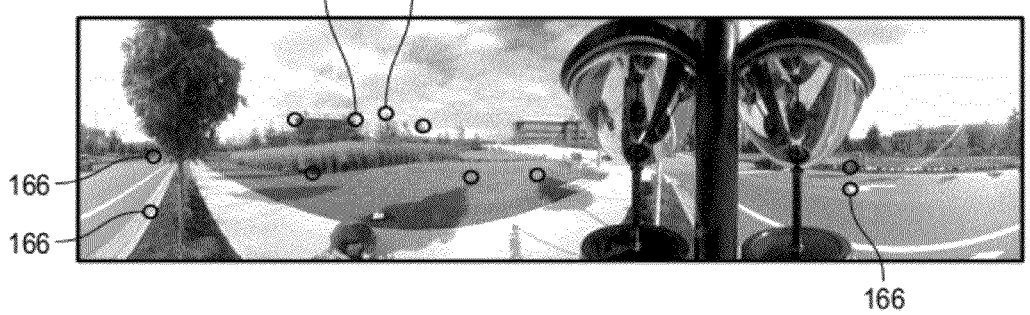
Figure 20:
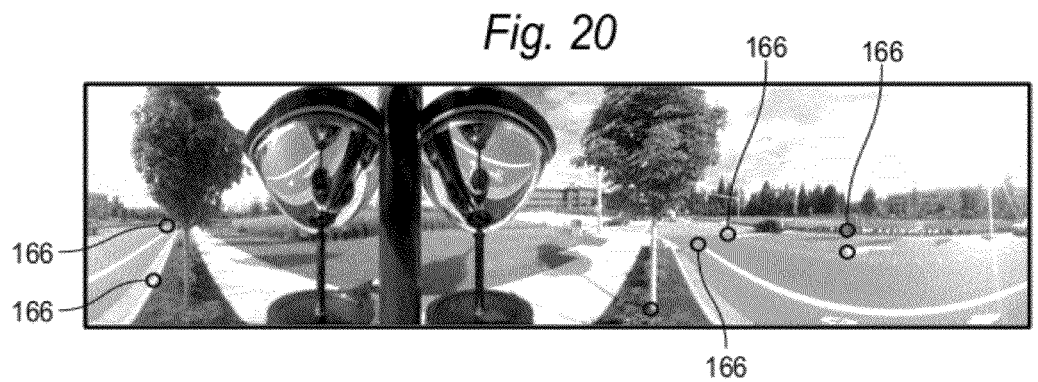
Figure 21:
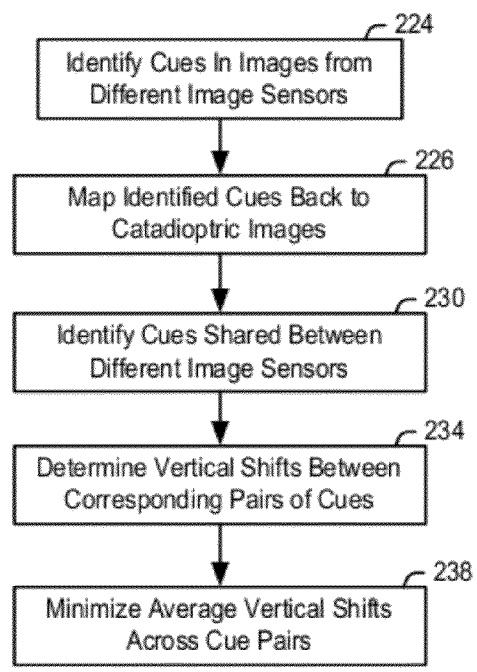
FIG. 21 is a flowchart showing further details of step 208 of FIG. 13.

FIG. 18 again shows the cylindrical data of a panorama generated by the first image sensor in steps 200 and 208. FIGS. 19 and 20 similarly show the cylindrical image data generated by the second and third image sensors in a similar manner, respectively. As can be seen, when capturing the full 360° panorama, each image sensor captures images of the remaining image sensors in its view. As noted above, the images generated by each image sensor have four variable parameters: two parameters defining the image center ($x_{cen}$, $y_{cen}$); the minimum radius, $r_{min}$, from center to edge of the projected mirror stem; and maximum radius, $r_{max}$, from center to outer edge of the mirror. For a three image sensor system, there are thus twelve variable parameters.

However, by keeping one of the image sensors as a reference, with the other image sensors compared to the reference, the number of variable parameters may be reduced to eight. The goal of the calibration step 208 is to select variable parameters of the second and third image sensors so as to minimize the vertical shift between the cylindrical images generated by the three image sensors.

One method of performing the calibration step 208 is by identifying point features such as object corners, 166 in the images generated by the different image sensors 112, 114 and 116. Further details of such a calibration step are now described with reference to the flowchart of FIG. 21. In step 224, the point features 166 (some of which are labeled in FIGS. 18-20) from the images of the different image sensors are identified. A point feature may be a data point that has local intensity edges, and hence is easily identified between the images from different image sensors. Ideally, a number of such spatially well-distributed point features are identified within each image. Aspects of other objects within an image may be cues as well.

Various known algorithms exist for identifying cues from an image. Such algorithms are set forth for example in Mikolajczyk, K., and Schmid, C., "A Performance Evaluation Of Local Descriptors," *IEEE Transactions on Pattern Analysis & Machine Intelligence,* 27, 10, 1615-1630. (2005), which paper is incorporated by reference herein in its entirety. A further method of detecting cues with image data is the Scale-Invariant Feature Transform (SIFT) algorithm. The SIFT algorithm is described for example in U.S. Pat. No. 6,711,293, entitled, "Method and Apparatus for Identifying Scale Invariant Features in an Image and Use of Same for Locating an Object in an Image," issued Mar. 23, 2004, which patent is incorporated by reference herein in its entirety. Another cue detector method is the Maximally Stable Extremal Regions (MSER) algorithm. The MSER algorithm is described for example in the paper by J. Matas, O. Chum, M. Urba, and T. Pajdla, "Robust Wide Baseline Stereo From Maximally Stable Extremal Regions," *Proc. of British Machine Vision Conference*, pages 384-396 (2002), which paper is incorporated by reference herein in its entirety.

Once point features from the respective images are identified, these point matches may be mapped back to the input catadioptric images (FIGS. 14 and 16) in step 226. For a given set of hypothesized camera parameters, the cues 166 from the input images may be mapped to cylindrical coordinates. In step 230, the cues are compared between images to identify the same cues in different images. In step 234, the vertical (y-coordinate) shifts between corresponding pairs of cues 166 may be found. Values for the variable parameters are thus selected which yield the minimum average of vertical shifts (disparities) in step 238. In one embodiment, the Nelder-Mead simplex algorithm may be used to search for the locally optimal camera parameters which minimize the vertical shifts between image sensors 112, 114 and 116. The Nelder-Mead simplex algorithm is set forth for example in the publication by Nelder, John A., R. Mead, "A Simplex Method For Function Minimization," Computer Journal 7: 308-313 (1965), which publication is incorporated herein by reference in its entirety.

After the images are calibrated to each other, the images from each image sensor 112, 114 and 116 are separated into left and right views in step 212. A left view refers to image data that will be displayed to the user's left eye, and a right view refers to image data that will be displayed to the user's right eye, to thereby create the stereoscopic effect when the panorama is displayed to a user. Of significance, when two image sensors receive image data from the same portion of the scene, the two images contain parallax, due to their offset from each other within the catadioptric chassis assembly 104. The captured parallax is responsible for the stereoscopic effect.

Each image sensor generates both left and right views, depending on what area of the panorama the image data is coming from. When receiving image data from one area of the panorama, an image sensor provides the right view, and when receiving image data from another area of the panorama, that same image sensor may provide the left view. Further details of the separation of image data from the image sensors into left and right views are now explained with reference to the flowchart of FIG. 21 and the illustrations of FIGS. 8, 9 and 23.

In step 250, for a given catadioptric chassis assembly configuration, it may be predetermined what views captured by each image sensor will be used as left views, right views or not used, based on the orientation of the assembly relative to the portion of the panorama being captured. As seen in FIGS. 8 and 9, when the catadioptric chassis assembly 104 is oriented as shown in FIG. 8, images from the portion P1 of the panorama are captured by the image sensors 112 and 114. The two image sensors receive image data from portion P1, with the image sensor 112 receiving left side image data and the image sensor 114 receiving right side image data. Due to the parallax between the two images, presentation of the left and right views of portion P1 from the image sensors 112 and 114, respectively, will enable the stereoscopic view of portion P1. As explained below, the apparent interocular distance changes depending on whether image data is coming from the middle portion of P1 or from a side portion of P1, which change can be corrected for. When viewing portion P1, image sensor 116 captures the appearance of at least one of image sensors 112, 114. As such, the view from image sensor 116 is not used for image data coming from portion P1.

In the same manner, image sensors 114 and 116 provide the left and right views, respectively, of portion P2. Image sensor 112 is not used for image data coming from portion P2. The image sensors 116 and 112 provide the left and right views, respectively, of portion P3. Image sensor 114 is not used for image data coming from portion P3. Thus, around a 360° panorama, a given image sensor will provide a left view, a right view and no view.

Figure 22:
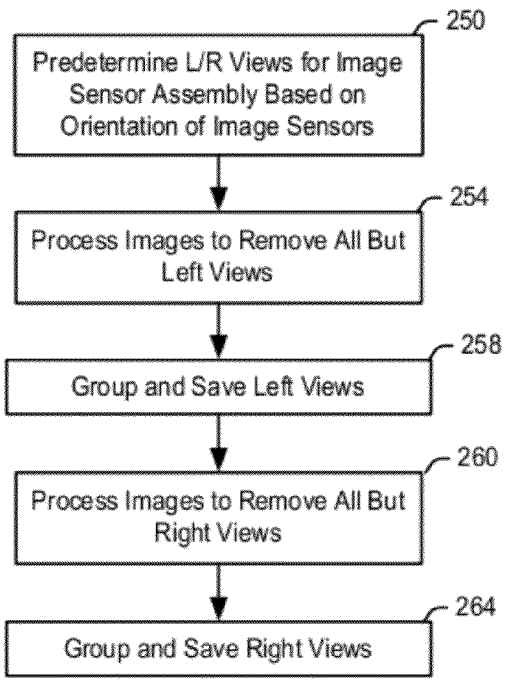
FIG. 22 is a flowchart showing further details of step 212 of FIG. 13.
Figure 23:
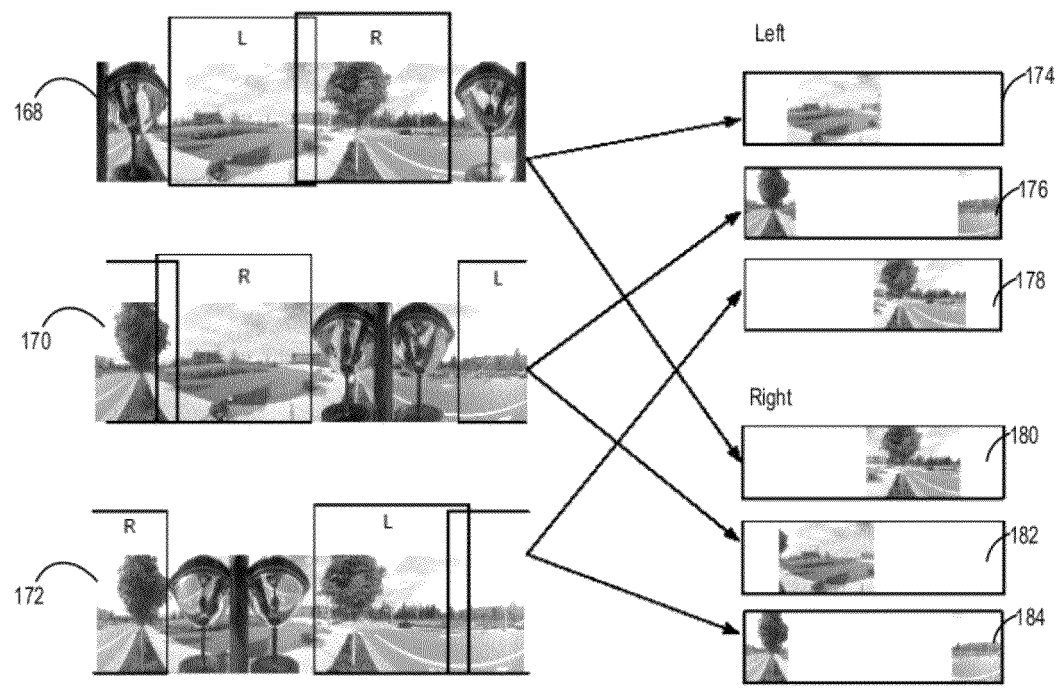
FIG. 23 is a view of cylindrical images from different image sensors being separated into left and right views.

Referring now to the flowchart of FIG. 22 and the illustration of FIG. 23, the left views from each of the image sensors 112, 114 and 116 are grouped together, and the right views from each of the image sensors 112, 114 and 116 are grouped together. FIG. 23 shows cylindrical images 168, 170 and 172, taken for example from image sensors 112, 114 and 116, respectively. The left and right views are marked on each of images 168, 170 and 172. Each of the images 168, 170, 172 is then processed in step 254 to remove all but the left views, and saved as a group of images 174, 176 and 178 in step 258. Similarly, the images 168, 170 and 172 are processed again to remove all but the right views in step 260, which images are then saved as a group of images 180, 182 and 184 in step 264. The images 168, 170 and 172 may then be stitched together to provide left view image data of the entire panorama, but with the image sensors processed out of the image. Similarly, the images 174, 176 and 178 may then be stitched together to provide right view image data of the entire panorama, but with the image sensors processed out of the image. The stitching steps are explained hereinafter.

Figure 24:
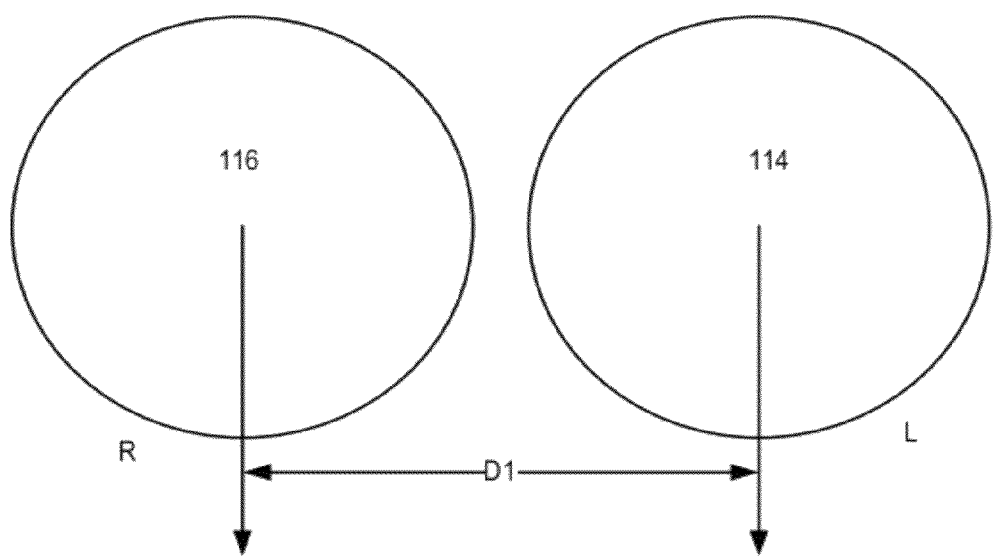
FIGS. 24 and 25 are two examples of differing apparent interocular distances when receiving image data from different portions of the panorama.
Figure 25:
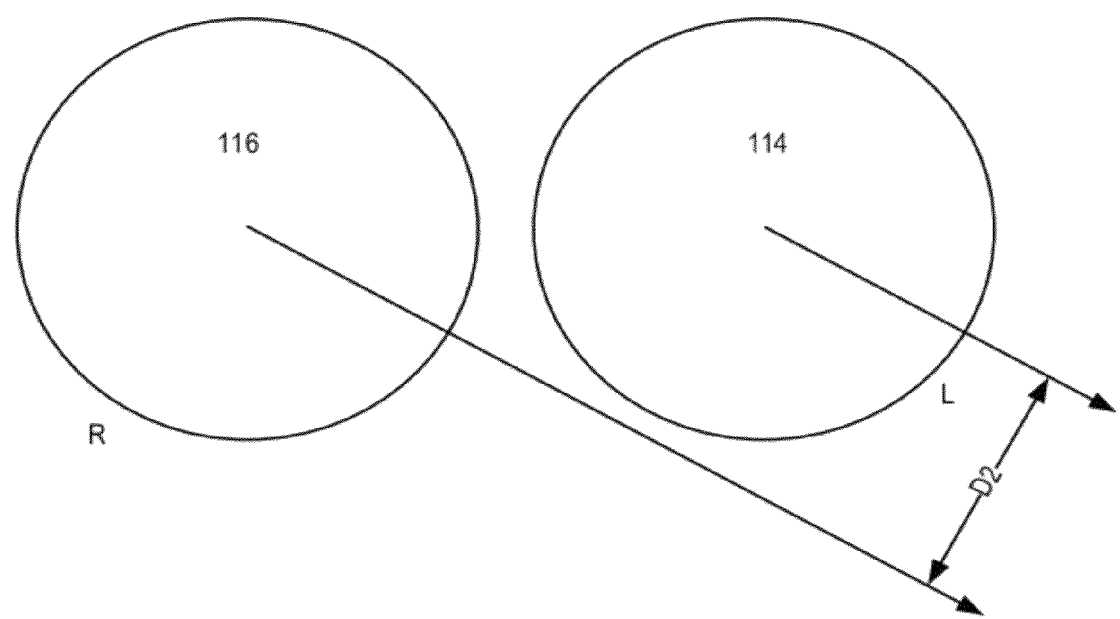

As noted above, the apparent interocular distance between a pair of image sensors may change, depending on what portion of the panorama the image sensors are receiving image data from. For example, FIGS. 24 and 25 illustrate two cases. In the first case, image sensors 114 and 116 are viewing a portion of the panorama effectively straight ahead of the image sensors (in the arbitrary convention described above, this would be from the middle portion of P2). "Straight ahead" in this context can mean perpendicular to a line between the optical axes of image sensors 114 and 116. The apparent interocular distance is D1. In the second case of FIG. 25, the image sensors 114 and 116 are viewing a portion of the panorama closer to a boundary, for example, closer to portion P1. The apparent interocular distance is D2. D2 is less than D1. Accordingly, the stereoscopic effect of the left and right image data captured of the portion of the panorama in FIG. 25 will not be the same as the stereoscopic effect of left and right image data captured of the portion of the panorama in FIG. 24.

Accordingly, referring to step 214 in FIG. 13, the left images 168, 170, 172 and right images 174, 176, 178 may be processed to correct for the apparent interocular distance changes between views taken from the middle of a portion of the panorama, and views taken to the sides. This processing step may involve processing the image to effectively change the vantage point from which images are captured so that the apparent interocular distance is the same whether viewing a portion of the panorama straight ahead or to the sides. This change of vantage point is not an actual change in the camera position. It is a translation of the vantage point of the image sensor in machine space to effectively translate the image data as if the image sensor were at a different vantage point. Having calibrated the image sensors to each other, the position of each image sensor is known with respect to each other in a single reference system. As such, the image data from any of the image sensors may be translated using known matrix transformations, where the shifts are in part dependent on scene depth, so as to appear to have been generated at a different vantage point. The step 214 of correcting for apparent interocular distance changes may be omitted in further embodiments.

Figure 26:
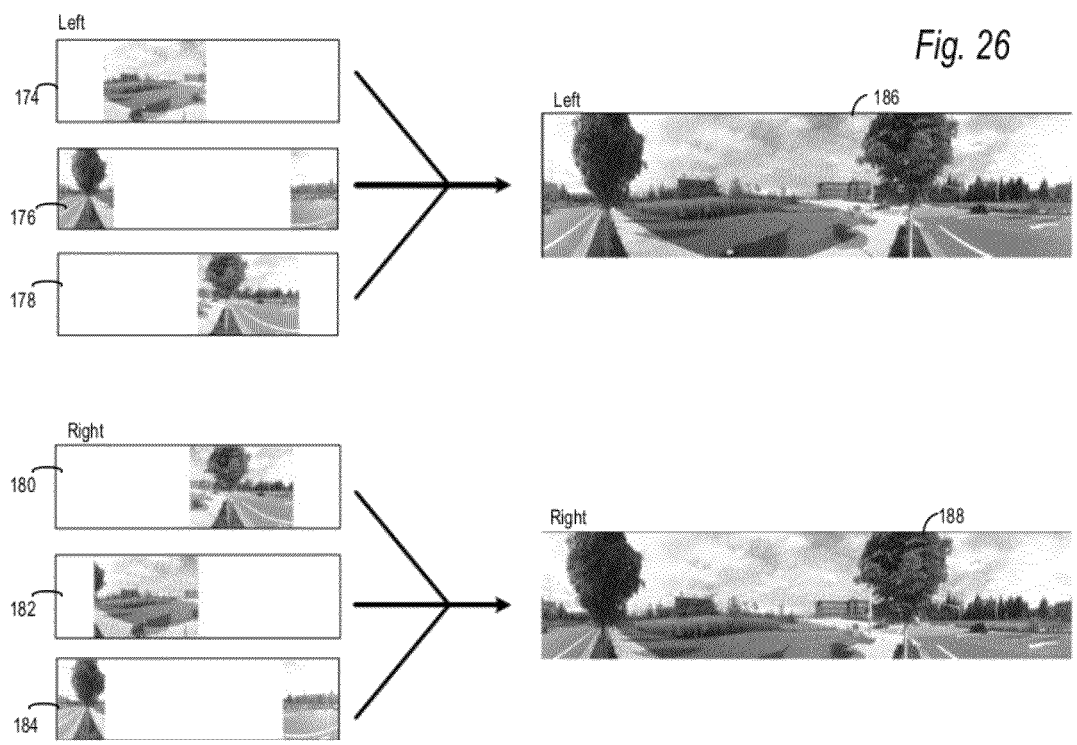
FIG. 26 is a view of left images being combined into a panoramic left image, and right images being combined into a panoramic right image.

Referring now to step 218 in FIG. 13 and the illustration of FIG. 26, once left images 174, 176, 178 and right images 180, 182, 184 are obtained as described above, the left images may be combined into a single panoramic left image 186, and the right images may be combined into a single panoramic right image 188. In the three image sensor configuration described above, it is possible that each of the left images 174, 176, 178 and right images 180, 182, 184 span only 120°, so that, when combined into panoramic left image 186 and panoramic right image 188, each comprises an entire panorama of 360°. However, when combining the left images 174, 176, 178, for example, each comes from a different image sensor and a slightly different perspective. Thus, even though the image sensors are capturing the same image at the seams between images, the parallax between the different views will cause a discontinuity at the seams where the images are combined. The same is true when combining right images 180, 182, 184 into panoramic right image 188.

In order to prevent discontinuities, each of the left and right views captured by image sensors 112, 114, 116 may each span slightly greater than 120°, so that when left images 174, 176, 178 are combined, there is overlap at the seams. The same is true for right images 180, 182, 184. Combined images may for example overlap by 10° to 20°, though the overlap may be greater or lesser than that in further embodiments.

Figure 27:
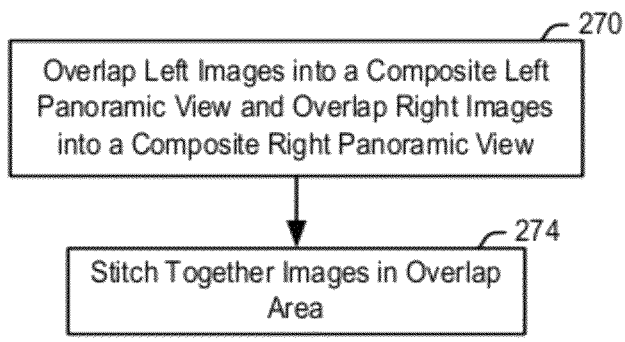
FIG. 27 is a flowchart showing further details of step 218 of FIG. 13.

Further details of step 218 of combining the left images 174, 176, 178 and right images 180, 182, 184 will now be explained with reference to the flowchart of FIGS. 27. Combining images involves a step 270 of overlapping the edges of the left images together to form a composite panoramic left image, and overlapping the right images together to form a composite panoramic right image. Thereafter, a stitching algorithm is performed in the overlapping areas in step 274 to remove the appearance of any seams.

Figure 28:
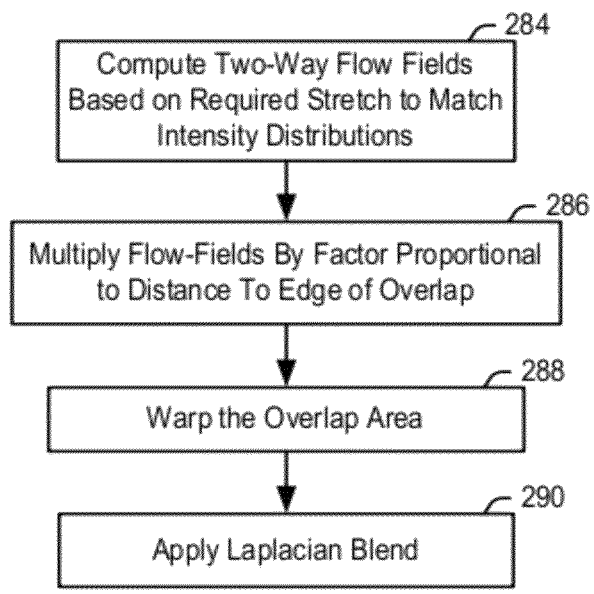
FIG. 28 is a flowchart showing further details of step 274 of FIG. 27.

Further details of the stitch operation of step 274 are described with reference to the flowchart of FIG. 28 and the illustrations of FIGS. 29-32. FIG. 29 shows a pair of images 190 and 192 that are to be stitched together. The images 190, 192 may come from any of the left side images 174, 176, 178 or right side images 180, 182, 184 shown in FIG. 26. The image 192 is shown in dashed lines for clarity. The images 190 and 192 include objects 194, 196, which could be any objects captured by the image sensors. There may be less or many more such objects in further examples. FIG. 30 shows the images 190, 192 combined, with an overlap area 198. Although the images are taken of the same objects, as the images are taken from slightly different perspectives, the objects do not align perfectly over each other. Object 194 is shown as objects 194a and 194b in the overlap area 198, and object 196 is shown as objects 196a and 196b in the overlap area 198.

In step 284, two flow fields are computed; one flow field that warps features of image 190 to corresponding features in image 192 in the overlap region 198, and another flow field that warps features of image 192 to corresponding features in image 190 in the overlap region 198. Each flow field is computed the same way, by locally comparing the intensity distribution and shifting pixels so as to minimize the difference in the intensity distributions. This has the effect of aligning objects 194a and 194b, and objects 196a and 196b, respectively. In embodiments, image features such as object corners and edges may also be identified and aligned in order to compute the flow. As a result of calibration, the shifts between 190 and 192 in the overlap area 198 are horizontal. By keeping scene objects at a minimum distance, the shift can be kept reasonably small so as to allow the optic flow computation to be tractable. The pixel shifts in the overlap area may not be the same. That is, the offset distance $d_1$ between objects 194a and 194b may be different than the offset distance $d_2$ between objects 196a and 196b.

In step 284, two-way flow fields are computed based on the distance required to match the intensity distributions. In embodiments, the movement may be horizontal, but some small vertical movement may also be required for image alignment, due to hardware imperfections and inaccuracies in the calibration process. In embodiments, the two-way flow fields may be computed using a Horn-Schunck flow algorithm, for example described in B. K. P. Horn and B. G. Schunck, "Determining Optical Flow," Artificial Intelligence, vol. 17, pp 185-203 (1981), which publication is incorporated by reference herein in its entirety. Other known algorithms may be used for computing the flow fields based on the corresponding patterns from the overlapped images.

As noted above, different pixels from the corresponding objects may need to be moved different distances along lines in the overlap area 198. The flow field lines may be horizontal, or they may be horizontal with a small vertical offset as well. The flow field lines may have a width of a single pixel or a flow field line may be multiple pixels long. Where corresponding pixels in corresponding intensity distributions are relatively far apart, that will result in a relatively strong flow field. Conversely, where corresponding pixels in corresponding brightness patterns are relatively close together, that will result in a relatively weak flow field.

If the image data was simply shifted by the computed flow fields to align corresponding intensity distributions, there would be gaps in the image at the borders of the overlap area. In order to account for this, the distances by which pixels are to move along each flow field line are multiplied by a factor ranging between 0 and 1 in step 286, which factor is proportional to the distance from the edge of the overlap. In a first pass, the pixels from image 190 are warped in step 288 from left to right along the computed flow field, as shown in FIG. 31. FIG. 31 shows three portions of the flow field $x_1$, $x_2$ and $x_3$. Pixels from image 190 that are at the left border of overlap area 198 have their flow field multiplied by 0. As such, these pixels are not moved. Pixels near the left border in image 190 have a small, non-zero factor. As such, pixels in image 190 near the left border are shifted right a small amount equal to the flow field multiplied by the small factor. Pixels in the middle move by a factor of about one-half of the flow field. And finally, pixels at the right border of the overlap area are moved by the full amount of the flow field (the flow field multiplied by 1).

As seen in FIG. 31, after the first pass, pixels in the object 194a warped only a small distance toward the object 194b because the object 194a is near the left border. On the other hand, after the first pass, pixels in the object 196a warped a large proportion of the distance toward object 196b because the object 196a is near to the right border.

In a second pass of step 286, pixels from image 192 are warped from right to left along the same computed flow fields $x_1$, $x_2$ and $x_3$, as shown in FIG. 32. As above, pixels from image 192 that are at the right border of overlap area 198 have their flow field multiplied by 0. As such, these pixels are not moved. Pixels in the middle move by a factor of about one-half of the flow field. And pixels at the left border of the overlap area are moved by the full amount of the flow field (the flow field multiplied by 1).

In step 290, a Laplacian blend is applied to the warped images generated in the first and second passes described above. A description of a Laplacian blend technique is set forth for example in P. J. Burt and E. H. Adelson, "A Multi-resolution Spline With Application To Image Mosaics," ACM Transactions on Graphics, Vol. 2. No. 4, Pages 217-236 (October 1983), which publication is incorporated by reference herein in its entirety. However, in general, the images generated from the first and second passes are first decomposed into a set of band-pass filtered component images. Next, the component images in each spatial frequency band are assembled into a corresponding band-pass mosaic. In this step, component images are joined using a weighted average within a transition zone which is proportional in size to the wavelengths represented in the band. Finally, the band-pass mosaic images are summed to obtain the composite image within overlap area 198. The effect of steps 280 to 290 is to warp the overlap area to align high frequency objects without leaving gaps in the image and without blurring objects within the image. It is understood that known algorithms other than a Laplacian blend may be used to smooth and blend the image.

Referring again to the high level flowchart of FIG. 13, once the left and right panoramic images 186 and 188 are obtained, the images may be displayed to a user via a 3D display headset (not shown), which displays the left panoramic image 186 to the user's left eye, and the right panoramic image 188 to the user's right eye. The left and right panoramic images 186 and 188 may be displayed to the user in step 222. The user may be provided with a control, either in the 3D display headset or as a separate controller, which allows the user to look forward, left, right or behind. Regardless of where the user looks, a stereoscopic view of the panorama is displayed. In further embodiments, the image data may be expanded to provide not just cylindrical stereoscopic image data, but spherical stereoscopic image data. In such embodiments, additional image sensor may be provided to capture image data from above and below the user.

The above-described steps of FIG. 13 may be performed for each new frame of image data obtained in the image sensors. In one example, the image sensors may sample image data at 60 Hz, though the sample rate may be higher or lower than that in further embodiments. Thus, stereoscopic video data may be displayed to the user, where the user is free to select any view of the video panorama around 360°. In further embodiments, the image sensors may capture a still image of the panorama around 360° or less.

While the present system advantageously provides a stereoscopic view of a panorama around 360°, it is understood that the panorama viewed by the image sensors and/or displayed to the user may be less than 360°. In a further example, the panorama may be 180° and angles between 180° and 360°. In further embodiments, the panorama may be less than 180°.

Figure 33:
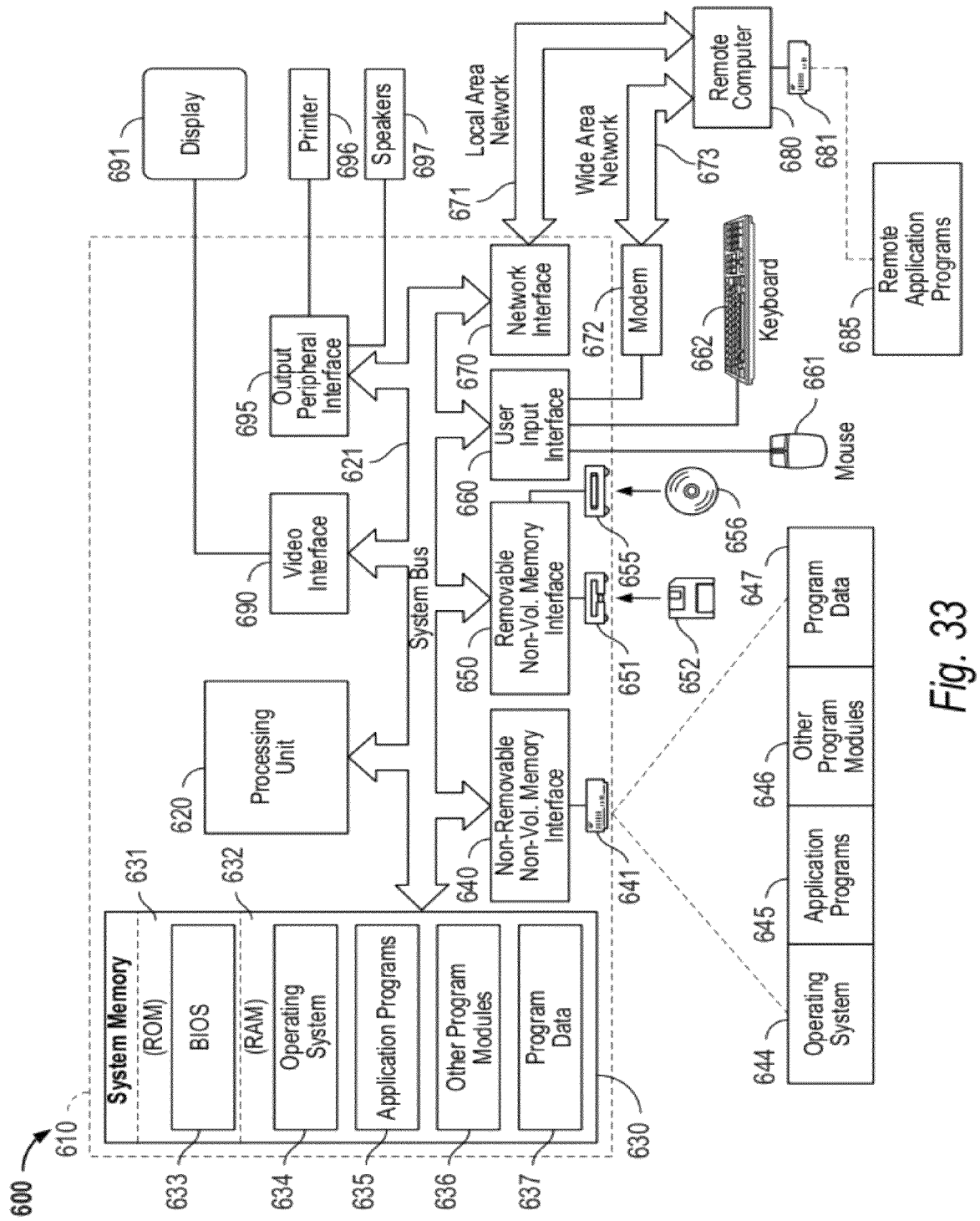
FIG. 33 is a block diagram of a sample computing device on which embodiments of the present system may be implemented.

FIG. 33 shows an exemplary computing system which may be any of the computing systems mentioned above. FIG. 33 shows a computer 610 including, but not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 33 illustrates operating system 634, application programs 635, other program modules 636, and program data 637.

The computer 610 may also include other removable/non-removable, volatile/nonvolatile computer storage media. By way of example only, FIG. 33 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 33, provide storage of computer readable instructions, data structures, program modules and other data for the computer 610. In FIG. 33, for example, hard disk drive 641 is illustrated as storing operating system 644, application programs 645, other program modules 646, and program data 647. These components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 33. The logical connections depicted in FIG. 33 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 33 illustrates remote application programs 685 as residing on memory device 681. It will be appreciated that the network connections shown are exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method of forming a stereoscopic image from multiple image sensors, comprising the steps of:
   (a) combining together a first set of images from different image sensors, the first set of images to be used as a left side perspective in the stereoscopic image and the first set of images being combined with an overlap of the first set of images;
   (b) combining together a second set of images from the different image sensors, the second set of images to be used as a right side perspective in the stereoscopic image and the second set of images being combined with an overlap of the second set of images;
   (c) removing an appearance of a seam between a pair of images in an overlap area of the first and second set of images, said step (c) including the steps of:
      i) aligning objects from the two different images in the overlap area by stretching the first image in a first direction by a factor of zero at a first boundary of the overlap and by a factor of one at the opposite boundary, and
      ii) aligning objects from the two different images in the overlap area by stretching the second image in a second direction, opposite the first direction, by a factor of zero at the second boundary of the overlap and by a factor of one at the opposite boundary,
         said steps (c)(i) and (c)(ii) comprising the steps of stretching different objects by different horizontal distances in the overlap area.

2. The method of claim 1, further comprising the step of removing disparities as in said step (c) in each of three overlap areas for the combined first set of images, and in each of three overlap areas for the combined second set of images.

3. The method of claim 1, further comprising the step of applying a Laplacian blend to the left and right halves of the overlap area after aligning the objects in said steps (c)(i) and (c)(ii).

4. The method of claim 1, said step (c)(i) and (c)(ii) comprising the step of stretching horizontal rows of pixels in the overlap area.

5. A method of forming a stereoscopic image from multiple image sensors, comprising the steps of:
   (a) combining together a first set of images with parallax, the first set of images to be used as a left side perspective in the stereoscopic image and the first set of images being combined with an overlap of the first set of images;
   (b) combining together a second set of images with parallax, the second set of images to be used as a right side perspective in the stereoscopic image and the second set of images being combined with an overlap of the second set of images;
   (c) removing an appearance of a seam between a pair of images in an overlap area of the first and second set of images, the first and second set of images including a first object and a second object, the first image object one being the first object in the first image, the second image object one being the first object in the second image, the first image object two being the second object in the first image, and the second image object two being the second object in the second image said step (c) including the steps of:
      i) computing optical flow using horizontal and/or vertical disparity between corresponding pixels in an overlap area,
      ii) cross fading left to right with a weighted factor, which factor increases from left to right,
      iii) cross fading right to left with a weighted factor, which factor increases from right to left,
      iv) warping using flows modified in steps (c)(ii) and (c)(iii), and
      v) applying Laplacian blend between a left half and a right half of the overlap area,
         said steps c(i) to c(v) moving the first image object one and the second image object one toward each other a first distance, and the said steps c(i) to c(v) moving the first image object two and the second image object two toward each other a second distance, the first distance being larger than the second distance.

6. The method of claim 5, where in the weighted factor used in step (c)(ii) and (c)(iii) increases from 0 to 1.

7. The method of claim 5, wherein the first set of images are captured from three image sensors arranged in triangular relation to each other.

8. The method of claim 7, wherein the second set of images are captured from the same three image sensors that captured the first set of images.

9. The method of claim 5, wherein said steps (c)(i) to (c)(iv) are performed on horizontal rows of pixels in the overlap area.

10. The method of claim 9, wherein the optical flow is the same for each horizontal row of pixels in the overlap area.

11. The method of claim 9, wherein the optical flow along a first horizontal row of pixels is different than the optical flow along a second horizontal row of pixels in the overlap area.

12. The method of claim 9, wherein the optical flow is determined using the Horn-Schunck algorithm.

13. The method of claim 5, wherein the images in the first and second sets of images are time synchronized to each other prior to being combined.

14. A machine-readable storage medium, not including a modulated data signal, for programming a processor to perform a method of forming a stereoscopic image from three image sensors, comprising the steps of:
   (a) combining together a first set of three images from the three image sensors, the first set of three images taken around 360° of a panorama to be used as a left side perspective in the stereoscopic image of the panorama, the first set of images being combined with an overlap;
   (b) combining together a second set of three images from the three image sensors, the second set of three images taken around 360° of a panorama to be used as a right side perspective in the stereoscopic image of the panorama, the second set of images being combined with an overlap;
   (c) removing an appearance of a seam between a pair of images in an overlap area of the first and second set of images, said step (c) including the steps of:
      i) computing optical flow using horizontal and/or vertical disparity between corresponding objects in an overlap area,
      ii) cross fading left to right with a factor weighted between 0 at left edge of overlap area and 1 at the right edge of the overlap area,
      iii) cross fading right to left with a factor weighted between 0 at right edge of overlap area and 1 at the left edge of the overlap area,
      iv) warping using flows modified in steps (c)(ii) and (c)(iii), and
      v) applying Laplacian blend between a left half and a right half of the overlap area,
      said steps (c)(i) to (c)(v) comprising the steps of stretching different objects by different horizontal distances in the overlap area.

15. The storage medium of claim 14, wherein said steps (c)(i) to (c)(iv) are performed on horizontal rows of pixels in the overlap area.

16. The storage medium of claim 15, wherein the optical flow along a first horizontal row of pixels is different than the optical flow along a second horizontal row of pixels in the overlap area.

17. The storage medium of claim 14, wherein the area of overlap between each image in the first and second sets of images is between 10° and 20°.

* * * * *